(12) United States Patent
Heyns et al.

(10) Patent No.: US 7,930,195 B2
(45) Date of Patent: Apr. 19, 2011

(54) STRATEGIC MANAGEMENT AND BUDGETING TOOLS

(75) Inventors: Herman R. Heyns, Weybridge (GB); Stuart Reilly, Egham (GB); Stewart Smythe, Farnham (GB); Brian F. McCarthy, Atlanta, GA (US)

(73) Assignee: Accenture Global Services Limited, Dublin (IE)

( * ) Notice: Subject to any disclaimer, the term of this patent is extended or adjusted under 35 U.S.C. 154(b) by 1610 days.

(21) Appl. No.: 10/443,602

(22) Filed: May 21, 2003

(65) Prior Publication Data

US 2004/0073441 A1    Apr. 15, 2004

Related U.S. Application Data

(60) Provisional application No. 60/418,218, filed on Oct. 11, 2002.

(51) Int. Cl.
*G06Q 90/00* (2006.01)
(52) U.S. Cl. ............................................. 705/7; 705/35
(58) Field of Classification Search .................. 705/7, 35
See application file for complete search history.

(56) References Cited

U.S. PATENT DOCUMENTS

| | | | | |
|---|---|---|---|---|
| 5,774,881 | A * | 6/1998 | Friend et al. | 705/36 R |
| 6,073,104 | A * | 6/2000 | Field | 705/1 |
| 6,651,219 | B1 * | 11/2003 | Elliott | 715/209 |
| 6,768,995 | B2 | 7/2004 | Thier et al. | |
| 6,859,785 | B2 * | 2/2005 | Case | 705/36 R |
| 7,130,822 | B1 * | 10/2006 | Their et al. | 705/35 |
| 2001/0032195 | A1 | 10/2001 | Graichen et al. | |
| 2001/0053991 | A1 | 12/2001 | Bonabeau | |
| 2002/0077877 | A1 * | 6/2002 | Oliver | 705/8 |
| 2002/0107819 | A1 * | 8/2002 | Ouimet | 705/400 |
| 2002/0173998 | A1 | 11/2002 | Case | |
| 2002/0173999 | A1 | 11/2002 | Griffor et al. | |
| 2002/0174049 | A1 * | 11/2002 | Kitahara | 705/36 |
| 2002/0184067 | A1 * | 12/2002 | McLean et al. | 705/7 |
| 2003/0004790 | A1 | 1/2003 | Calderaro et al. | |
| 2003/0055717 | A1 | 3/2003 | Badugu et al. | |
| 2003/0130884 | A1 | 7/2003 | Michaluk | |
| 2003/0149610 | A1 * | 8/2003 | Rowan et al. | 705/10 |
| 2003/0177056 | A1 * | 9/2003 | Winther | 705/10 |

(Continued)

OTHER PUBLICATIONS

Poon, Margaret, et al. "Budget participation, goal interdependence and controversy: a study of a Chinese public utility." Management Accounting Research. Mar. 2001, vol. 12: pp. 101-118.*

(Continued)

*Primary Examiner* — Beth V Boswell
*Assistant Examiner* — Neil R Kardos
(74) *Attorney, Agent, or Firm* — Finnegan, Henderson, Farabow, Garrett & Dunner, LLP

(57) ABSTRACT

A target setting, forecasting, and budgeting method and tools are provided in which targets are selected at a high level of management through a process of strategic planning to select targets based on a combination of value expected to be added and manageability of the candidate targets, including computer simulations of increased cash flow expected to be generated by the target strategies. The strategically planned targets are then flowed down to the various levels of management, budgets are constructed around those target strategies, and the budgets are then consolidated and flowed upward. By defining organizational targets and then aligning those targets with strategic goals from the beginning, the number and scope of iterations of budget adjustments can be reduced.

21 Claims, 25 Drawing Sheets

U.S. PATENT DOCUMENTS

| | | | |
|---|---|---|---|
| 2003/0204440 | A1 | 10/2003 | Koller et al. |
| 2004/0010435 | A1 | 1/2004 | Stewart et al. |
| 2004/0039616 | A1 | 2/2004 | Maycotte et al. |
| 2004/0039619 | A1* | 2/2004 | Zarb .............................. 705/7 |
| 2004/0039676 | A1 | 2/2004 | Trainer |
| 2004/0068431 | A1 | 4/2004 | Smith et al. |
| 2004/0128174 | A1 | 7/2004 | Feldman |
| 2004/0186765 | A1 | 9/2004 | Kataoka |
| 2004/0236738 | A1* | 11/2004 | Thier et al. .................... 707/4 |
| 2005/0262014 | A1* | 11/2005 | Fickes ........................... 705/38 |
| 2007/0203786 | A1 | 8/2007 | Nation et al. |
| 2008/0071588 | A1* | 3/2008 | Eder .............................. 705/7 |

OTHER PUBLICATIONS

Auditor-General's Report to Parliament Jan. 2000.*
City Council Staff Report Budget Update.*
Michigan Budgetary Comparison Schedule Jan. 2001.*
Whiting, Rick. "Budget Planning: The Next Generation." InformationWeek. vol. 805 (Sep. 2000). pp. 160-164.*
Berger, James T. "A necessary evil? It's budget time again." Office Solutions. vol. 17, No. 12 (Dec. 2000). pp. 22-26.*
McNally, Robert. "The annual budgeting process." Accountancy Ireland. vol. 34, No. 1 (Feb. 2002). pp. 10-12.*
Neumann, Bruce R. "Streamline budgeting in the new millennium." Strategic Finance. vol. 83, No. 6 (Dec. 2001). pp. 44-49.*
Adaytum Software, www.adaytum.co.uk, retrieved via www.archive.org (Mar. 2001), pp. 1-41.*
Simon, Gary, "Plan to Throw Away Your Spreadsheet! A product review of Adaytum Planning." Financial Systems News (Apr. 1998), pp. 1-4.*
Teach, Edward, "Budgeting and Planning: Planning for the Masses." CFO Magazine (Mar. 2000), pp. 1-3.*
Cognos Finance Fact Sheet (Jul. 2001), retrieved via www.archive.org, pp. 1-2.*
Hyperion Planning Fact Sheet (Aug. 2000), retrieved via www.archive.org, pp. 1-2.*
Hyperion Planning, www.hyperion.com, retrieved via www.archive.org (Feb. 2001), pp. 1-9.*
Brigham, Eugene F. and Phillip R. Daves. "Intermediate Financial Management." 7th ed. South-Western Thomson Learning. Oct. 26, 2001.*
Koller, Timothy. "What is Value-Based Management?" The McKinsey Quarterly, 1994: No. 3. pp. 87-101.*
Dayco Statement Regarding Related Applications.
Antos, John (1999) *A Better Way to Budget: Solving Traditional Budgeting Problems with Activity Based Budgeting*.
Baldrige National Quality Program. "Criteria for Performance Excellence."2001.
"*First High-End Reporting and Analysis Solution to offer Best-in-Class OLAP Integrated with MicroSoft Office 97 and 2000*" Business Wire, p. 0105, Feb. 21, 2000.
*Launch of Revolutionary Web-Based Adaytum e.Planning (TM) Enables Enterprises to Deliver Forecasts with Speed and Confidence*; PR Newswire, p. 2215; Nov. 15, 1999.
"New software takes planning to the Web"; Financial Executive; Singh, Laurie Kaplan; Nov./Dec. 2000, v16n6, pp. 22-28.
www.adaytum.com retrieved from Wayback machine; archive.org anylinke Apr. 21, 2000.
Office Action issued on Jan. 14, 2008 by US PTO on U.S. Appl. No. 10/443,177.
Office Action issued on Feb. 26, 2008 by US PTO on U.S. Appl. No. 10/444,021.
Office Action issued on Mar. 14, 2008 by US PTO on U.S. Appl. No. 10/443,187.
Office Action issued on Jul. 16, 2008 by US PTO on U.S. Appl. No. 10/443,177.
Allen, D., "Must 'Shareholder Value' Mean Excessive Short-Termism?," *Management Accounting* (UK), vol. 75, No. 4, 1997, p. 14.
Anon, "Business Management Focus: of Pigs and Pokes," *The Economist*, Mar. 1998, p. 69.
Anon, "Finance Can Inhibit Shareholder Value Creation," *Management Accounting* (UK), Apr. 1998, London, p. 10.
Anon, "How to Report Financial Performance," *Management Accounting* (UK), vol. 77, No. 11, 1998, p. 11.
Anon, "Companies Not Implementing Value-Based Management," *Management Accounting* (UK), vol. 77, No. 4, 1999, p. 3.
Anon, "Business: Gassing Away at Gazprom," *The Economist*, vol. 357, No. 8202, 2000, p. 104.
Anon, "Measuring the Future: The Value Creation Index," *Cap Gemini Ernst & Young*, Cambridge, Massachusetts, 2000.
Anon, "Mike Fires Back," *Fortune*, Nov. 27, 2000, pp. 133-134.
Anon, "Rethinking: Life Without Budgets," *Harvard Management Update, Harvard Business School*, 2000.
Anon, "Investor Opinion Survey," *White Paper on McKinsey & Company Website*, 2001.
Anon, "Role of Financial Planning and Analysis," *White Paper on FP&A Train Web Site*, http://ftpatrain.com/wrole.htm, 2001.
Anon, "Value Reporting Forecast: 2001 Trends in Corporate Reporting," *Price WaterhouseCoopers Report*, 2001
Anon, "Value Reporting Forecasting: 2001 Best Practices Examples," *Price WaterhouseCoopers Report*, 2001.
Arterian, S., Sprint Retools the Budget Process, *CFO Magazine*, Sep. 1997, pp. 88-91.
Ashworth, G., "Delivering Shareholder Value Through Integrated Performance Management," *Financial Times—Prentice Hall*, London, 1999.
Ashworth, G., "Delivering Shareholder Value Through Integrated Performance Management," *Management Accounting* (UK), London, Mar. 2000, pp. 42-44.
Babbibi, C., "Reality Check: Is Traditional Budgeting Under Siege?," *CMA Management*, Hamilton, Nov. 1999.
Banham, R., "Better Budgets," *Journal of Accountancy*, Feb. 2000, pp. 37-40.
Barsky, N. P., et al., "Performance Measurement, Budgeting and Strategic Implementation in the Multinational Enterprise," *Managerial Finance*, vol. 25, No. 2, 1999, pp. 3-15.
Basu, S. et al., "International Variation in Accounting Measurement Rules and Analysts Earnings Forecast Errors," *Journal of Business and Finance*, vol. 25, Nos. 9 & 10, 1998, pp. 1207-1247.
Bierbusse, P., et al., "Measures that Matter," *Journal of Strategic Performance Measurement*, vol. 1, No. 2, 1997, pp. 6-11.
Block, F. E., "A Study of the Price to Book Relationship," *Financial Analysts Journal*, Jan./Feb. 1995, pp. 63-73.
Bradley, R. A., "Does Dividend Policy Matter," *The Revolution in Corporate Finance*, Edited by J. M. Stern and D. H. Chew, 1989.
Brimson, J., et al., "The Key Features of ABB," *Management Accounting* (UK), vol. 69, No. 1, 1991, pp. 42-43.
Bunce, P., "Budgets: The Hidden Barrier to Success in the Information Age," *Accounting and Business*, Mar. 1999, p. 24.
Burton, A., "Shareholder Value Budgeting," *Management Accounting* (UK), London, Jun. 1996.
Campbell, J., "Stock Returns and the Term Structure," *Journal of Financial Economics*, vol. 18, 1987, pp. 373-379.
Campbell, J., et al., "Stock Prices, Earnings and Expected Dividends," *The Journal of Finance*, vol. xiii, No. 3, Jul. 1988.
Campbell, J., et al., "The Dividend-Price Ration and Expectations of Future Dividends and Discount Factors," *The Review of Financial Studies*, vol. 1, 1988, pp. 195-228.
Chugh, L., et al., "The Stock Valuation Process, the Analysts View," *Financial Analysts Journal*, Nov.-Dec. 1984, pp. 41-48.
Coller, M., et al., "Management Forecasts: What Do We Know?," *Financial Analysts Journal*, Jan./Feb. 1998, pp. 58-62.
Connolly, T., et al., "An Integrated Activity based Approach to Budgeting," *Management Accountant*, vol. 72, No. 3, 1994, pp. 32-37.
Conroy, R. M., "A Test of the Relative Pricing Effects of Dividends and Earnings: Evidence from Simultaneous Announcements in Japan," Journal of Finance, vol. 55, No. 3, 2000, p. 1199.
Cooper, S. et al., "Return on Investment," *Management Accounting* (UK), London, Jun. 2000.
Copeland, T. et al., "Valuation: Measuring and Managing the Value of Companies," *John Wiley & Sons*, New York, 1995.
Copeland, T. et al., "The Hidden Value of Capital Efficiency," *McKinsey Quarterly*, vol. 2, 1993, pp. 45-58.

Dahyaa, J. et al., "Changes in Corporate Management: Do They Have an Impact on Share Prices and Company Earnings?," *Managerial Finance*, vol. 26, No. 9, 2000, pp. 66-79.

Downes, F. A., "Re-inventing the Budget Process," 1996.

Easton, P. D., "Discussion of Revalued Financial, Tangible, and Intangible Assets: Association with Share Prices and Non-Market-Based Value Estimates," *Journal of Accounting Research*, 1998, p. 235.

Epstein, J. et al., "Add Accountability," *Executive Excellence*, Sep. 2000.

Fabozzi, F. J. et al. (Editors), "Value-Based Metrics: Foundations and Practice," *Frank J Fabozzi Associates*, New Hope, Pennsylvania, 2000.

Fama, E.F. et al., "Dividends Yields and Expected Stock Returns," *Journal of Financial Economics*, vol. 22, 1998, pp. 3-25.

Fletcher, Kelly, "City Counsel Staff Report Budget Update," Feb. 12, 2002.

Fraser, R. et al., "Beyond Budgeting . . . (Some Companies Abandon Budgets)," *Management Accounting* (UK), vol. 75, No. 2, 1997, p. 26.

French, D. et al., "The Market Valuation of Earnings and Real Growth," *Journal of Investing*, Spring 1998, pp. 54-60.

Gurton, A., "Bye Bye Budget . . . ," *Accountancy*, London, Mar. 1999.

Hendersen, I., "Does Budgeting Have to be So Troublesome," *Management Accounting* (UK), Oct. 1997.

Hirst, D. E. et al., "The Joint Effect of Management's Prior Forecast Accuracy and the Form of Its Financial Forecast on Investor Judgment," *Journal of Accounting*, vol. 37, 1999, pp. 101-124.

Hofstede, G., "The Game of Budget Control," *Tavistock*, London, 1968.

Hope, J., "Beyond Budgeting: Pathways to the Emerging Model, Balanced Scorecard Report Article," *Harvard Business School*, May 15, 2000.

Hope J. et al., "Beyond Budgeting . . . Breaking Through the Barrier to 'the Third Wave'," *Management Accounting* (UK), London, Dec. 1997.

Hope, J. et al., Managing Without Budgets, CAM-I Report (1999).

Hope, J., et al., "Beyond Budgeting: Building a New Management Model for the Information Age," *Management Accounting* (UK), Jan. 1999, pp. 16-21.

Hope, J., et al., "Take It Away Accountancy," *Accountancy*, London, May 1999.

Hope, J., et al., "Figures of Hate," *Financial Management Magazine*, CIMA, Feb. 2001.

Hope, T., et al., "Chain Reaction," People Management, vol. 3, No. 19, 1997, pp. 26-29, 31.

Jehle, K., "Budgeting as a Competitive Advantage," *Strategic Finance*, Montvale, Oct. 1999.

Johnson, H. T. et al., "Relevance Lost—The Rise and Fall of Management Accounting," *Harvard Business School Press*, Boston, Massachusetts, 1987.

Kahn, K. B., "Benchmarking Sales Forecasting Performance Measures," *Journal of Business Forecasting*, Winter 1998, pp. 19-23.

Kaplan, R. S. et al., "Cost and Effect," *Harvard Business School Press*, Boston, 1997.

Kaplan, R. S. et al., "The Balanced Scorecard—Translating Strategy into Action," *Harvard Business School Press*, Boston, Massachusetts, 1996.

Kaplan, R. et al., "Linking Strategy to Planning and Budgeting, Balanced Scorecard Collaborative Report," *Harvard Business School*, 2000.

Kasznik, R., "On the Association Between Voluntary Disclosure and Earnings Management," *Journal of Accounting Research*, vol. 37, No. 1, 1999, pp. 57-81.

Keim, D. B. et al., "Predicting Returns in Stock and Bonds Market," *Journal of Financial Economics*, vol. 17, 1986, pp. 357-390.

Kennedy, J., "Discussion of the Joint Effect of Managements Prior Forecast Accuracy and the Form of its Financial Forecasts on Investor Judgment," *Journal of Accounting Research*, vol. 37, Supplement, 1999, pp. 125-134.

Kilroy, D. B. et al., "Stop Analyzing and Start Thinking: The Importance of Good Thinking Skills in a Value-Managed Company," *Management Decisions*, vol. 35, No. 3, 1997, pp. 185-193.

Knight, J. A., "Value Based Management—Developing a Systemic Approach to Creating Shareholder Value," *McGraw-Hill*, US, 1998.

Koller, "What is Value-Based Management?".

Lazere, C., "All Together Now—Why You Must Link Budgeting and Forecasting to Planning and Performance," *CFO Magazine*, Feb. 1998, pp. 28-36.

Marcino, G. R., "Obliterate Traditional Budgeting," *Financial Executive*, Morristown, Nov./Dec. 2000.

Martin, N. A., "A Question of Value," *Barron*, vol. 81, No. 1, 2001, p. 20.

Mavrinac, S. et al., "Measures that Matter: An Exploratory Investigation of Investor's Information Needs and Value Priorities," *Working Paper*, 1997.

McDonald, T., "Stop Strategic Planning . . . And Create Shareholder Value!," *Management Decision*, vol. 36, No. 7, 1998, pp. 456-459.

McEwen, R. A. et al., "Is Analyst Forecast Accuracy Associated with Accounting Information Use?," *Accounting Horizons*, vol. 13, No. 1, 1999, pp. 1-16.

McLemore, I., "Winning the Battle of the Budget," *Controller Magazine*, Sep. 1996.

McTaggart, J. et al., "The Value Imperative: Managing for Superior Shareholder Returns," *The Free Press*, New York, 1994.

Mentzer, J., "The Impact of Forecasting on Return on Shareholder's Value," *Journal of Business Forecasting*, Fall, 1999.

Merkley, B. W., "Does Enterprise Risk Management Count?," *Risk Management Magazine*, vol. 48, No. 4, 2001.

Meyer, M., "Finding Performance," *Cambridge University Press*, Cambridge, 2001.

Mikhail, M. B. et al., "Does Forecast Accuracy Matter to Security Analysts?," *The Accounting Review*, vol. 74, No. 2, 1999, pp. 185-200.

O'Connell, B., "Beyond Budgeting & Forecasting: New Tools, Strategies Making an Old Job Easier," *Business Finance Magazine*, 2000.

Oldman, A., "Abandoning Traditional Budgeting," *Management Accounting* (UK), Nov. 1999.

Otley, D., "Performance Management: A Framework for Management Control Systems Research," *Management Accounting Research*, vol. 10, 1999, pp. 363-382.

Pellet, J., "Are Companies Getting the Share Price They Deserve?," *Chief Executive*, Sep. 2000, vol. 159, pp. 76.

Pownall, G., et al., "The Stock Price Effects of Alternative Types of Management Earning Forecast," *The Accounting Review*, vol. 68, No. 4, 1993, pp. 896-912.

Prendergast, P., "Budgets Hit Back," *Management Accounting* (UK), vol. 78, No. 1, 2000, pp. 14-16.

Racanelli, V., "Recipe for Growth," *Barron*, Dec. 2000, pp. 19-21.

Rappaport, A., "Creating Shareholder Value," *The Free Press*, New York, 1986.

Rappaport, A., "Creating Shareholder Value: A Guide for Managers and Investors," *The Free Press*, New York, 1988.

Rutherford, B., "When is a Budget Not a Budget?," *Accounting and Business*, vol. 3, No. 8, 2000, pp. 14-15.

Serven, L., "Shareholder Value," *Executive Excellence*, vol. 16, No. 12, 1999, p. 13.

Serven, L., "The Planning Peril," *Journal of Accountancy*, New York, Apr. 2000, pp. 61-64.

Simons, R., "Performance Measurement & Control Systems for Implementing Strategy—Text and Cases," *Prentice Hall*, New Jersey, 1999.

Simons, R., "Levers of Control," *Harvard Business School Press*, Boston, Massachusetts, 1995.

Stewart, III G. Bennett, "The Quest for Value," *HarperCollins Publishers, Inc.*, 1991.

Trapp, R., "Finance: Budgeting for the Future," *The Independent*, London, Jan. 1999.

Troy, M., "Sears Overview: Changes and Challenges Define Current Transitions," *DSN Retailing Today*, vol. 39, No. 23, 2000, p. 27.

Tsoukalas, D., et al., "The Determinants of Stock Prices: Evidence from the United Kingdom Stock Market," 1999.

Verschoor, C. C., "A Study of the Link Between a Corporation's Financial Performance and its Commitment to Ethics," vol. 17, No. 13, 1998, p. 1509.

Waddock, S. A., et al., "Finding the Link Between Stakeholder Relations and Quality of Management," *Journal of Investing*, Winter 1997, pp. 20-24.

Wardell, C., "High-Performance Budgeting, Harvard Management Update Article," *Harvard Business School*, Jan. 1, 1999.

West, R. N., et al., "How to Set Up a Budgeting and Planning System," *Management Accounting* (US), vol. 78, No. 7, 1997, p. 20.

Wight, O., "ABCD Checklist—Definitive Performance Measures," *Oliver Wights Inc.*, 1988.

Young, N. W., "Rolling with the Forecast," *Banking Strategies*, May/Jun. 1998, p. 66.

Zarowin, P., "Discussion of Intangible Assets and Stock Prices in the Pre-SEC Era," *Journal of Accounting Research*, 1999.

"Beyond Budgets," *Economist Intelligence Unit Ltd., Business Europe*, vol. 40, No. 9, 2000, p. 4.

"Comparison of 2000-01 Budget and Actual Result," *Auditor-General's Report to Parliament*, vol. 6, 2001.

"World Class Budgeting and Forecasting—Benchmarking Survey," *Charles Schwab & Co and Accenture*, 1998.

www.adaytum.com Retrieved from archive.org Anylinkage, Oct. 8, 2000.

Office Action, dated Mar. 27, 2009, in U.S. Appl. No. 10/444,021 (14 pages).

Office Action, dated Aug. 22, 2008, in U.S. Appl. No. 10/444,021 (12 pages).

Office Action, dated Mar. 23, 2009, in U.S. Appl. No. 10/443,177 (16 pages).

Office Action, dated Jul. 16, 2008, in U.S. Appl. No. 10/443/177 (9 pages).

Office Action, dated Jan. 4, 2008, in U.S. Appl. No. 10/443/177 (8 pages).

Office Action, dated Apr. 20, 2007, in U.S. Appl. No. 10/443,177 (8 pages).

Office Action, dated Nov. 16, 2006, in U.S. Appl. No. 10/443,177 (9 pages).

Office Action, dated May 19, 2006, in U.S. Appl. No. 10/443,177 (7 pages).

Office Action, dated Jan. 19, 2006, in U.S. Appl. No. 10/443,177 (5 pages).

Office Action, dated Mar. 24, 2009, in U.S. Appl. No. 10/443,187 (15 pages).

Office Action, dated Aug. 26, 2008, in U.S. Appl. No. 10/443,187 (12 pages).

Office Action, dated Mar. 14, 2008, in U.S. Appl. No. 10/443,187 (13 pages).

Office Action, dated Sep. 11, 2007, in U.S. Appl. No. 10/443,187 (11 pages).

Office Action, dated Oct. 2, 2009, in U.S. Appl. No. 10/444,021 (13 pages).

Office Action, dated May 25, 2010, in U.S. Appl. No. 10/444,021 (12 pages).

Advisory Action, dated Aug. 3, 2010, in U.S. Appl. No. 10/444,021 (3 pages).

Office Action, dated May 21, 2010, in U.S. Appl. No. 10/443,187 (23 pages).

Advisory Action, dated Aug. 4, 2010, in U.S. Appl. No. 10/443,187 (3 pages).

Office Action, dated Aug. 4, 2010, in U.S. Appl. No. 12/536,201 (20 pages).

Office Action, dated May 27, 2010, in U.S. Appl. No. 10/443,177 (13 pages).

Advisory Action, dated Aug. 11, 2010, in U.S. Appl. No. 10/443,177 (3 pages).

\* cited by examiner

PRIOR ART BUDGETING input
companies

Click here for HELP

Which Metrics would you like to use?
○ Economic Profit and Standard Financial  ● EVA® and Standard Financial

---

Target Company

Search for Target Company by:

● Company Name [usair]    ○ Industry [--Select An Industry--]    ○ Country

Comparison Companies

Search for Comparison Companies by:

Comparison Company 1:
○ Company Name [        ]    ○ Industry [--Select An Industry--]    ○ Country

Comparison Company 2:
○ Company Name [        ]    ○ Industry [--Select An Industry--]    ○ Country

Comparison Company 3:
○ Company Name [        ]    ○ Industry [--Select An Industry--]    ○ Country

Comparison Company 4:
○ Company Name [        ]    ○ Industry [--Select An Industry--]    ○ Country

Comparison Company 5:
○ Company Name [        ]    ○ Industry [--Select An Industry--]    ○ Country

[Submit]

---

Target Company

[USAir]

Comparison Companies

[Airlines----Delta Air Lines]
[-- Select A Company --]
[-- Select A Company --]

FIG. 4

Value Management — Finance and Performance Management Service Line

[ overview ] [ input ] [ metrics ] [ graphs ] [ backup data ] [ my profile ] [ logout ]

graphs
comparison data

| | | | | |
|---|---|---|---|---|
| Market Value Added (MVA) | Graph | Data | | |
| Economic Value Added (EVA®) | Graph | Data | | |
| NOPLAT Return less the Weighted Average Cost of Capital (WACC) | Graph | Data | Industry Average | Sector Average |
| NOPLAT Return(R*) | Graph | Data | Industry Average | Sector Average |
| Weighted Average Cost of Capital (WACC) | Graph | Data | Industry Average | Sector Average |
| Sales over Average Capital | Graph | Data | Industry Average | Sector Average |
| EVA® Margin | Graph | Data | Industry Average | Sector Average |
| NOPLAT Growth % | Graph | Data | Industry Average | Sector Average |
| Revenue Growth | Graph | Data | Industry Average | Sector Average |
| Gross Margin % | Graph | Data | Industry Average | Sector Average |
| Sales, General & Administrative Expense (SG&A) as a % of Sales | Graph | Data | Industry Average | Sector Average |
| EBITDA Margin | Graph | Data | Industry Average | Sector Average |

FIG. 5A

| Working Capital Effectiveness | Graph | Data | Industry Average | Sector Average |
|---|---|---|---|---|
| Cash to Cash Cycle Time | Graph | Data | Industry Average | Sector Average |
| Days Sales Outstanding | Graph | Data | Industry Average | Sector Average |
| Day Supply of Inventory | Graph | Data | Industry Average | Sector Average |
| Days Payables Outstanding | Graph | Data | Industry Average | Sector Average |
| Capital Expenditures Ratio | Graph | Data | Industry Average | Sector Average |
| Cash Conversion Efficiency | Graph | Data | Industry Average | Sector Average |

Feedback

FIG. 5B

| Graph # 10 Gross Margin % | | | | | |
|---|---|---|---|---|---|
| Fiscal Year Ends: Company Name | 1995 | 1996 | 1997 | 1998 | 1999 |
| USAir | " | " | " | " | " |
| Fiscal Year Ends: Company Name | 1995 | 1996 | 1997 | 1998 | 1999 |
| Delta Air Lines | " | " | " | " | " |
| Fiscal Year Ends: Industry Average | 3 | 4 | 5 | 6 | 7 |
| Airlines | 'n | 'n | 'n | 'n | 'n |
| Fiscal Year Ends: Sector Average | 3 | 4 | 5 | 6 | 7 |
| Transportation | 'n | 'n | 'n | 'n | 'n |

Source: Worldscope and Accenture Finance and Performance Management Service Line " data does not display, the Worldscope data is not available for the company missing.

Download

FIG. 6

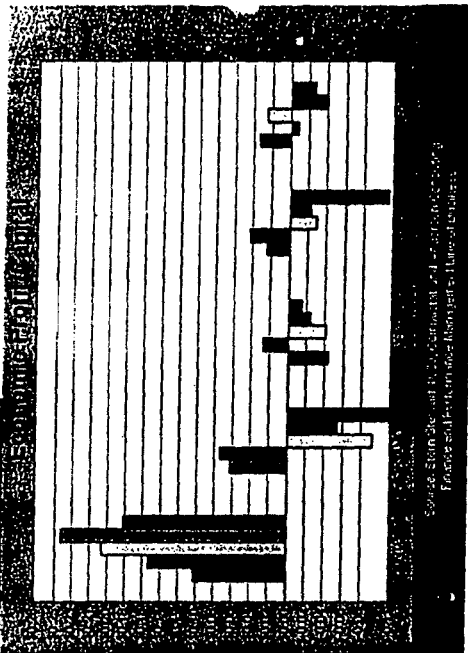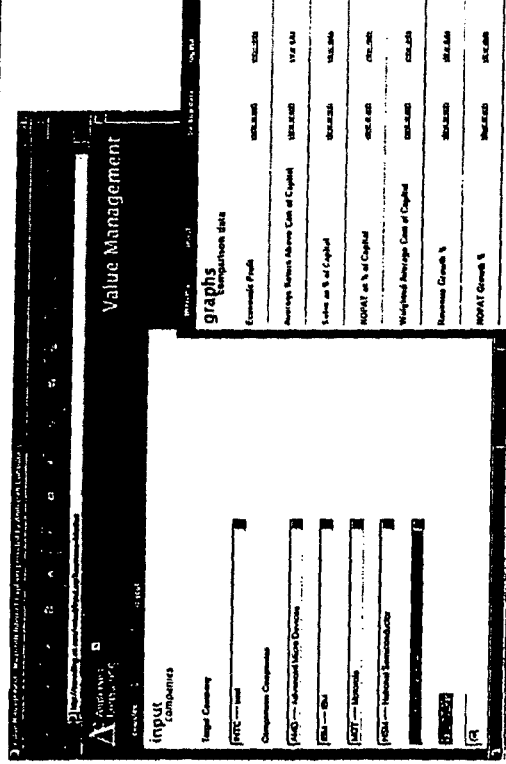
FIG. 9

| | FREE CASH FLOW | NET INCOME | YE BALANCE SHEET | AVG BALANCE SHEET | SUPPLEMENTAL DATA | |
|---|---|---|---|---|---|---|
| | 2000--Before | 2000--After | 2001--Before | 2001--After | 2002--Before | 2002--After | 2003--Before | 2003--After | 2004--Before | 2004--After |
| % | 0.3% | 5.2% | 0.8% | 4.3% | 0.8% | 3.9% | 0.8% | 3.6% | 0.8% | 0.8 |
| $ | $874 | $13,579 | $2,436 | $13,643 | $2,756 | $14,182 | $3,130 | $14,805 | $3,559 | $3,55 |
| | 10.00% | 9.50% | 10.00% | 9.50% | 10.00% | 9.50% | 10.00% | 9.50% | 10.00% | 10.00 |
| | 100.0% | #DIV/0! | 16.1% | 15.6% | 10.8% | 16.1% | 10.8% | 15.5% | 10.9% | -10.8 |
| Operating Activities: | | | | | | | | | | |
| Cash | $9,861 | $21,622 | $11,380 | $22,445 | $13,132 | $24,197 | $15,154 | $26,220 | $17,488 | $17,48 |
| Receivables | $12,447 | $12,444 | $14,364 | $14,364 | $16,576 | $16,576 | $19,129 | $19,129 | $22,074 | $22,07 |
| Inventory | ($5) | ($5) | ($1) | ($1) | ($1) | ($1) | ($1) | ($1) | ($1) | ($1 |
| Cash Mgmt Acct (Debt only) | ($32,315) | ($22,315) | ($4,977) | ($4,977) | ($5,743) | ($5,743) | ($6,627) | ($6,627) | ($7,648) | ($7,64 |
| Other Current Assets | ($79,763) | ($77,540) | ($12,284) | ($12,284) | ($14,175) | ($14,175) | ($16,358) | ($16,358) | ($16,877) | ($21,1 |
| Non-Interest Bearing | ($3,459) | ($3,459) | ($533) | ($533) | ($615) | ($615) | ($709) | ($709) | ($819) | ($31 |
| Other LT Liabilities | ($6,722) | ($6,722) | ($1,035) | ($1,035) | ($1,195) | ($1,195) | ($1,379) | ($1,379) | ($1,591) | $1,59 |
| | $56,871 | $30,204 | $8,758 | $8,758 | $10,107 | $10,107 | $11,663 | $11,663 | $13,460 | $40,12 |
| | $10,622 | $10,622 | $1,636 | $1,636 | $1,888 | $1,888 | $2,178 | $2,178 | $2,514 | $2,51 |
| Investing Activities: | | | | | | | | | | |
| Net PP & E | ($109,174) | ($109,174) | ($16,813) | ($16,813) | ($19,402) | ($19,402) | ($22,390) | ($22,390) | ($25,638) | ($25,83 |
| Depreciation Expense | ($12,447) | ($12,444) | ($14,364) | ($14,364) | ($16,576) | ($16,576) | ($19,129) | ($19,129) | ($22,074) | ($22,07 |
| Other LT Assets | ($12,937) | ($12,937) | ($1,992) | ($1,992) | ($2,299) | ($2,299) | ($2,653) | ($2,653) | ($3,062) | ($3,06 |
| Total (x this by Cap Struct%) | ($189,329) | ($213,777) | ($41,604) | ($41,604) | ($48,011) | ($48,011) | ($55,404) | ($55,404) | ($63,937) | ($39,49 |
| Financing Activities: | | | | | | | | | | |
| I(Dec) in Debt | $37,866 | $42,755 | $8,321 | $8,321 | $9,602 | $9,602 | $11,081 | $11,081 | $12,787 | $7,89 |
| Cash | $5 | $5 | $1 | $1 | $1 | $1 | $1 | $1 | $1 | $1 |
| Cash Mgmt Account | $3,459 | $3,459 | $533 | $533 | $615 | $615 | $709 | $709 | $819 | $81 |
| Flow | ($125,691) | ($133,482) | ($7,006) | $4,059 | ($8,085) | $2,980 | ($9,330) | $1,735 | ($10,767) | $8,78 |
| | 100.0% | #DIV/0! | 16.1% | 15.6% | 10.8% | 16.1% | 10.8% | 15.5% | 10.9% | -10.8 |
| | #DIV/0! | #DIV/0! | #DIV/0! | #DIV/0! | #DIV/0! | #DIV/0! | 20.3% | 36.8% | 4.4% | 9.7 |

FIG. 15

Scenario Impact - Income Statement (Accounts Payable)

FIG. 16

Scenario Impact - Balance Sheet (Accounts Payable)

| | HOME | FREE CASH FLOW | | NET INCOME | | YE BALANCE SHEET | | AVG BALANCE SHEET | | SUPPLEMENTAL DATA | |
|---|---|---|---|---|---|---|---|---|---|---|---|
| | | 2000--Before | 2000--After | 2001--Before | 2001--After | 2002--Before | 2002--After | 2003--Before | 2003--After | 2004--Before | 2004--After |
| % | 0.3% | 1.0% | 0.8% | 0.8% | 0.8% | 0.8% | 0.8% | 0.8% | 0.8% | 0.8% | |
| $ | $874 | $2,596 | $2,436 | $2,372 | $2,758 | $2,694 | $3,130 | $3,066 | $3,559 | |
| | 10.00% | 9.50% | 10.00% | 10.00% | 10.00% | 10.00% | 10.00% | 10.00% | 10.00% | |
| | 100.0% | #DIV/0! | 16.1% | 15.9% | 10.8% | 10.9% | 10.8% | 11.0% | 10.9% | |
| Interest bearing Liabilities | 33,060 | 31,320 | 38,151 | 31,194 | 44,026 | 37,070 | 50,806 | 43,850 | 58,630 | |
| Debt | 50,083 | 51,678 | 57,796 | 64,395 | 66,697 | 73,295 | 76,968 | 83,566 | 88,821 | |
| ent Liabilities | 83,143 | 82,998 | 95,947 | 95,589 | 110,723 | 110,365 | 127,774 | 127,416 | 147,451 | |
| ebt | 39,024 | 39,024 | 45,034 | 45,034 | 51,969 | 51,969 | 59,972 | 59,972 | 69,208 | |
| ome tax | 7,132 | 7,132 | 8,230 | 8,230 | 9,497 | 9,497 | 10,960 | 10,960 | 12,648 | |
| Term Liabilities | 0 | 0 | 0 | 0 | 0 | 0 | 0 | 0 | 0 | |
| ock of Subsidiaries | 0 | 0 | 0 | 0 | 0 | 0 | 0 | 0 | 0 | |
| ss & Preferred Stock of | 129,299 | 129,152 | 149,211 | 148,853 | 172,190 | 171,831 | 198,707 | 198,349 | 229,308 | |
| est in Subsidiaries | 0 | 0 | 0 | 0 | 0 | 0 | 0 | 0 | 0 | |
| rnings | 94,666 | 94,999 | 109,475 | 109,770 | 126,335 | 126,629 | 145,790 | 146,084 | 168,242 | |
| | 1,605 | 1,608 | 1,852 | 1,852 | 2,137 | 2,137 | 2,467 | 2,467 | 2,846 | |
| (Average) | 96,471 | 96,607 | 111,328 | 111,622 | 128,472 | 128,766 | 148,257 | 148,551 | 171,088 | |
| ties and Equity (average) | $225,770 | $225,759 | $260,539 | $260,475 | $300,662 | $300,598 | $346,963 | $346,900 | $400,396 | |
| ECK: LIABILITIES & EQUITY? | YES | YES | YES | YES | YES | YES | YES | YES | YES | |

FIG. 17

Scenario Impact - Cash Flows (Accounts Payable)

| | 2000--Before | 2000--After | 2001--Before | 2001--After | 2002--Before | 2002--After | 2003--Before | 2003--After |
|---|---|---|---|---|---|---|---|---|
| % | 0.3% | 5.2% | 0.8% | 4.3% | 0.8% | 3.9% | 0.8% | |
| $ | $874 | $13,579 | $2,436 | $13,643 | $2,758 | $14,182 | $3,130 | |
| | 10.00% | 9.50% | 10.00% | 9.50% | 10.00% | 9.50% | 10.00% | |
| | 100.0% | #DIV/0! | 16.1% | 15.6% | 10.8% | 16.1% | 10.8% | |
| Operating Activities | | | | | | | | |
| Cash | $9,861 | $21,621 | $11,380 | $22,445 | $13,132 | $24,197 | $15,154 | |
| Receivables | $12,447 | $12,447 | $14,364 | $14,364 | $16,576 | $16,576 | $19,129 | |
| Inventory | ($5) | ($5) | ($1) | ($1) | ($1) | ($1) | ($1) | |
| Cash Mgmt Acct (Debit only) | ($32,315) | ($32,315) | ($4,977) | ($4,977) | ($5,743) | ($5,743) | ($6,627) | |
| Other Current Assets | ($79,763) | ($77,541) | ($12,284) | ($12,284) | ($14,175) | ($14,175) | ($16,358) | |
| Non-Interest Bearing | ($3,459) | ($3,459) | ($533) | ($533) | ($615) | ($615) | ($709) | |
| Other LT Liabilities | ($6,722) | ($6,722) | ($1,035) | ($1,035) | ($1,195) | ($1,195) | ($1,379) | |
| | $56,871 | $30,204 | $8,758 | $8,758 | $10,107 | $10,107 | $11,663 | |
| | $10,622 | $10,622 | $1,636 | $1,636 | $1,888 | $1,888 | $2,178 | |
| Investing Activities: | | | | | | | | |
| Net PP & E | ($109,174) | ($109,174) | ($16,813) | ($16,813) | ($19,402) | ($19,402) | ($22,390) | |
| Depreciation Expense | ($12,447) | ($12,447) | ($14,364) | ($14,364) | ($16,576) | ($16,576) | ($19,129) | |
| Other LT Assets | ($12,937) | ($12,937) | ($1,992) | ($1,992) | ($2,299) | ($2,299) | ($2,653) | |
| Debt (x this by Cap Struct%) | ($189,329) | ($213,773) | ($41,604) | ($41,604) | ($48,011) | ($48,011) | ($55,404) | |
| Financing Activities: | | | | | | | | |
| Inc/(Dec) in Debt | $37,866 | $42,755 | $8,321 | $8,321 | $9,602 | $9,602 | $11,081 | |
| Cash | $5 | $5 | $1 | $1 | $1 | $1 | $1 | |
| Cash Mgmt Account | $3,459 | $3,459 | $533 | $533 | $615 | $615 | $709 | |
| Flow | ($125,691) | ($133,487) | ($7,006) | $4,059 | ($8,085) | $2,980 | ($9,330) | |
| | 100.0% | #DIV/0! | 16.1% | 15.6% | 10.8% | 16.1% | 10.8% | 20.3% |

Scenario Impact - Income Statement (Inventory Analysis)

FIG. 20

Scenario Impact - Balance Sheet (Inventory Analysis)

| | 2000--Before | 2000--After | 2001--Before | 2001--After | 2002--Before | 2002--After | 2003--Before | 2003--After | 2004--Before | 2004--Before |
|---|---|---|---|---|---|---|---|---|---|---|
| % | 0.3% | 0.4% | 0.8% | -0.2% | 0.8% | -0.0% | 0.8% | 0.1% | 0.8% | 0.8% |
| $ | $874 | $1,018 | $2,436 | ($3,647) | $2,758 | ($108) | $3,130 | $514 | $3,559 | $3,559 |
| | 10.00% | 9.50% | 10.00% | 9.50% | 10.00% | 9.50% | 10.00% | 9.50% | 10.00% | 10.00% |
| | 100.0% | #DIV/0! | 16.1% | 15.2% | 10.8% | 9.6% | 10.8% | 9.8% | 10.9% | 10.9% |
| Equivalents | 27,941 | 40,441 | 32,214 | 82,244 | 37,209 | 87,209 | 42,939 | 92,939 | 49,552 | 49,552 |
| | 73,615 | 73,615 | 84,951 | 84,951 | 98,034 | 98,034 | 113,131 | 113,131 | 130,553 | 130,553 |
| ement Account | 865 | 865 | 998 | 998 | 1,152 | 1,152 | 1,329 | 1,329 | 1,534 | 1,534 |
| t Assets | 5,450 | 5,450 | 6,289 | 6,289 | 7,258 | 7,258 | 8,375 | 8,375 | 9,665 | 9,665 |
| ent Assets | 107,872 | 120,372 | 124,484 | 174,484 | 143,655 | 193,655 | 165,778 | 215,778 | 191,307 | 191,307 |
| arges | 10,216 | 10,216 | 11,789 | 11,789 | 13,604 | 13,604 | 15,699 | 15,699 | 18,117 | 18,117 |
| n Noncons. Cost+Equity | 7,500 | 7,500 | 8,655 | 8,655 | 9,988 | 9,988 | 11,526 | 11,526 | 13,301 | 13,301 |
| Term Assets | 324 | 324 | 374 | 374 | 431 | 431 | 498 | 498 | 574 | 574 |
| | 157,817 | 157,817 | 182,120 | 182,120 | 210,167 | 210,167 | 242,532 | 242,532 | 279,882 | 279,882 |
| er capital leases | 446 | 446 | 515 | 515 | 594 | 594 | 685 | 685 | 791 | 791 |
| in Progress | 8,987 | 8,987 | 10,371 | 10,371 | 11,968 | 11,968 | 13,812 | 13,812 | 15,939 | 15,939 |
| | 67,391 | 67,391 | 77,769 | 77,769 | 89,746 | 89,746 | 103,567 | 103,567 | 119,516 | 119,516 |
| depreciation | 99,859 | 99,859 | 115,237 | 115,237 | 132,983 | 132,983 | 153,463 | 153,463 | 177,096 | 177,096 |
| s (Average) | $225,770 | $238,270 | $260,539 | $310,539 | $300,662 | $350,662 | $346,963 | $396,963 | $400,396 | $400,396 |
| interest bearing Liabilities | 33,060 | 33,060 | 38,151 | 38,151 | 44,026 | 44,026 | 50,806 | 50,806 | 58,630 | 58,630 |
| ebt | 50,083 | 62,735 | 57,796 | 110,226 | 66,697 | 119,127 | 76,968 | 129,398 | 88,821 | 88,821 |
| ent Liabilities | 83,143 | 95,795 | 95,947 | 148,377 | 110,723 | 163,153 | 127,774 | 180,204 | 147,451 | 147,451 |
| ebt | 39,024 | 39,024 | 45,034 | 45,034 | 51,969 | 51,969 | 59,972 | 59,972 | 69,208 | 69,208 |
| me_tax | 7,132 | 7,132 | 8,230 | 8,230 | 9,497 | 9,497 | 10,960 | 10,960 | 12,648 | 12,648 |

FIG. 21

STRATEGIC MANAGEMENT AND BUDGETING TOOLS

RELATED APPLICATIONS

This application claims priority from U.S. provisional application Ser. No. 60/418,218, filed Oct. 11, 2002, which is hereby incorporated by reference in its entirety. This application is related to U.S. patent application Nos. 10/443,177, 10/443,187, and 10/444,021 which are being filed concurrently herewith.

FIELD OF THE INVENTION

This invention relates to methods and tools for planning and budgeting within a business organization. More particularly, the present invention relates to methods and tools for efficiently setting strategic targets and budgets within a business organization so as to increase cash flow and shareholder value.

BACKGROUND OF THE INVENTION

Research has shown that many companies believe that the planning and budgeting process within business organizations is broken. Many managers believe that the planning and budgeting process takes too long, requires too many people, and does not significantly help a business organization meet its goals.

The traditional approaches to planning and budgeting are widely criticized. A number of criticisms of the traditional approaches have been identified including: budgets are time consuming and costly to put together; budgets constrain responsiveness and flexibility and are often a barrier to change; budgets are rarely strategically focused and often contradictory; budgets add little value, especially given the time required to prepare them; budgets concentrate on cost reduction and not on value creation; budgets strengthen vertical command and control; budgets do not reflect the emerging network structures that organizations are adopting; budgets encourage "gaming" and perverse behaviors; budgets are developed and updated too infrequently, usually annually; budgets are based on unsupported assumptions and guesswork; budgets reinforce departmental barriers rather than encourage knowledge sharing; and budgets make people feel under-valued.

For example, a major car manufacture estimates that its planning and budgeting process costs 1.2 billion dollars to run. A major European automobile maker reported that 20 percent of all of its management time was tied up in the group's budgeting and planning process prior to its decision recently to abolish budgets. Published literature suggests that the average company with annual sales of one billion dollars spends 25,000 person-days per year planning and measuring performance. In contrast, the upper quartile is 6,000 person-days per year and the best is about 700 person-days per year. The CEO of one of the largest American corporations was quoted as saying "The budget is the bane of corporate America. It should never have existed . . . Making a budget is an exercise in minimalization. You're always getting the lowest out of people, because everyone is negotiating to get the lowest number."

Budgeting has also been criticized as producing and presenting the wrong target. According to this view, as soon as a company introduces a budget the aim becomes to beat the budget. However, the true aim of a company should not be to beat the budget. The true aim should be to beat the competition.

Traditional planning and budgeting is viewed as the periodic process by which organizations tend to define their forward operational expenditures and forecasted incomes. In its traditional sense, it is a top-down process, whereby budget packets go out from the corporate office to various divisions and operating units, accompanied by forms to be filled in and sales and operational forecasts to be completed. Once the necessary data has been entered, these budget packs are returned "bottom-up" to the corporate office. Subsequently, multiple iterations, which include the same path, are performed until final agreement is achieved. The resulting budget is usually produced weeks or months after the initial distribution of the budget forms, and this sets the "limits" to operate within and targets to be achieved, for the next budget period which is usually one year. Typically, monthly variance reports are produced and discussed.

A predominant theme in some of the literature on budgeting is that planning and budgeting processes traditionally used in many organizations are failing to deliver results. Fundamentally, the problem is that they add limited value to management of businesses. They are too time consuming and costly to undertake and they encourage political behavior and game playing rather than driving of business performance.

The budgeting and planning systems used in many firms today were developed many years ago for an industrial age, which was relatively static and simple to understand. Today's economy is much more turbulent, and attempts to develop long-term, fixed plans based on this old business model are naive. Underlying this theme is the recognition that since its inception in the $19^{th}$ century, cost management has gradually changed to cost accounting. Originally the aim was to provide a method of analysis that delivered valuable insights into how the business was performing, and why. Now, in many organizations, cost accounting has become so routine and pervasive that it is effectively a mechanistic procedure that managers feel they must perform. The impact of this has been that traditional management accounting, and the associated budgeting and planning processes, have lost their relevance to business and decision-making since the figures they contain are widely known to be of questionable validity and hence, dubious value.

A number of different "better budgeting" approaches have been suggested. Activity Based Budgeting (ABB) draws from well-established theories in Activity Based Costing (ABC) and Activity Based Management (ABM). ABM involves structuring the organization's activities and business processes, so that they better meet customer and external needs. ABB builds on this and seeks to ensure that any resource and capital allocation decisions that are made are consistent with the ABM analysis. Effectively ABB involves planning and controlling along the lines of value-adding activities and processes. Advocates of this approach have claimed that it can result in cost savings of between 10% and 20% through the implementation of better methods of working and the elimination of bureaucracy.

In Zero-Based Budgeting (ZBB) rather than basing budgets on previous years or periods, expenditures must be re-justified during each budgeting cycle. Some see Zero-Based Budgeting as the best attempt in many years to overcome the weaknesses of traditional budgeting, because it avoids building on the inefficiencies and inaccuracies of previous years. The problem, however, is that it is too time consuming to repeat every year, since it requires a company to build budgets from scratch. This is unnecessary in a stable business environment, and in fact is unlikely to deliver significant value on a continuous bases. That is because constantly challenging assumptions in a stable operating environment is unlikely to result in new insights. Indeed, a company can only get this sort of a set-change once every several years. More importantly, both ABB and ZBB do not really address the endemic shortcomings of traditional budgeting. Certainly, they provide alternative approaches to budgeting, but they are still time consuming, still result in game playing and add limited value after their first application.

Rolling Budgets and Forecasts relate to the need to make budgeting and forecasting more frequent to keep pace with changing circumstances. Methodologies in this area include rolling budgets, perpetual planning and rolling forecasts. These approaches are seen as more responsive to changing circumstances because they solve the problems associated with infrequent budgeting and hence result in more accurate forecasts. They are also designed to overcome the problems associated with budgeting to a fixed point in time—i.e., the year end and the often dubious practices that such cut-offs encourage. A disadvantage of the rolling budget approach is that it can result in greater cost to the organization because budgets have to be put together more frequently. Rolling forecasts, however, overcome this problem because they are often developed based on business models which in turn incorporate specific assumptions about the drivers of income and expenditure.

Value-Based Budgeting, while not an explicit replacement for budgeting and planning, provides a formal and systematic approach for managing the creation of shareholder value over time. It has three elements: beliefs, principles, and processes. The main approach is that all expenditure plans should be evaluated as project appraisals and assessed in terms of the shareholder value that they will create. Proponents of the approach note its ability to link strategy and shareholder value to planning and budgeting. However, there are few demonstrated detailed techniques for implementation, so much of the discussion on the topic appears to be of a conceptual nature. In fact, some commentators have gone as far as suggesting that too many organizations have become focussed on value measurement, rather than value management, which in turn limits the focus on value creation.

The Profit Planning wheel model for planning future financial cash flows of profit centers by assessing whether an organization or unit generates sufficient cash, creates economic value and attracts sufficient financial resources for investment. In theory this approach ensures consideration of an organization's short and long-term prosperity when preparing its financial plans. However, there are few examples of its practical applications.

The advocates of these approaches all claim benefits in organizations that have applied them. Case studies suggest that these benefits vary from marginal to substantial improvements, in terms of cost, time, communication and control. However, critics argue that each of the approaches effectively only involve re-engineering the traditional budgeting and planning processes and do not address fundamental problems. Moreover, there is evidence to show that while some of these approaches have solid theories underlying them, they are not being well implemented or well received by the organization. The literature suggests, for example, that many high level managers are dissatisfied with their current planning and budgeting processes, even when the companies had re-engineered them, and that many top managers within companies that have implemented one or more of these approaches believed that there were significant gaps between how financial executives had implemented the plans and how the top managers thought they should be able to apply them. Clearly, improvements are needed in the budgeting and planning process.

SUMMARY OF THE INVENTION

The inventors have recognized that the budget process can be improved by more closely aligning the organizational targets as represented by the budget and planning outputs with key strategies that will add real value to a company, and have implemented a number of strategies and developed a number of tools in order to allow an organization to better plan for value, budget for value, and incorporate planning for value within the culture of the organization. As the inventors have further recognized, the market prices of stocks are based on expectations of future cash flows, not strictly traditional accounting measures of corporate performance. Shareholder value is significantly affected by a company's strategy, capability, decisions, action, and results, and shareholders' perceptions of those factors.

The most desirable goals to target in all phases of planning including the budgeting process are the goals that will return the highest shareholder value and will be the most achievable, i.e., the most manageable. The least desirable goals are those that return the lowest shareholder value and will be the most difficult to achieve. By allowing an evaluator to predict to some extent how much shareholder value will be delivered by achieving particular goals, and which will be easiest or hardest to obtain, the evaluator can then prepare a set of recommendations to the board or other high level management regarding which of the candidate goals enumerated by the board will be most helpful to try to achieve within the coming year or other relevant period. Based on the evaluator's report the board then selects goals for the organization. Because the board has selected the goals and will therefore support those goals, the present method helps to take the guesswork out of much of the budgeting process in which managers at the bottom levels on up previously had to base much of their budget on guesses as to which goals the board of directors would support and to what extent, and which goals they would not support. In the present method, because the managers at all levels of an organization can now know from the beginning what goals and strategies the board will support, they can plan and budget to achieve those goals knowing that there will be in most cases very little change to their detailed tactics for implementing those preselected and pre-approved goals and strategies. Thus, there will be very little reconciliation that must be performed between the initial budgets proposed at the various levels throughout an organization and the final budgets that will satisfy the board of directors or other final budget making authority within the organization. The result is that the time, effort, and number of iterations necessary to complete the budgeting process is reduced, thereby accomplishing faster and less labor-intensive budgeting. This method of planning is preferably performed repeatedly with each consecutive budget cycle, and is incorporated into the culture of the organization. In one aspect, the process can be described as the steps of strategic planning and evaluation, followed by target setting, followed by bottom-up budgeting and cyclical forecasting, followed by performance management.

The inventors have developed an integrated approach to instill within an organization a value ethic in order to change the mindset and framework used for making organizational decisions. That approach includes the steps of (1) identifying and prioritizing the key drivers of value for a company, (2) creating operating strategies to maximize the impact on the key value drivers, (3) building and/or enhancing the critical capabilities necessary to execute the strategy, (4) aligning management processes, performance measures and compensation around execution of strategy, and (5) communicating both internally and externally on strategy and execution.

One aspect of an embodiment of the invention lies in the process by which the budget is set within an organization. The board of directors or other managing entity determines a candidate set of goals for the organization. Candidate goals might include, for example, decreasing the average outstanding sales account lag by ten days; purchasing new information technology; upgrading a manufacturing line; increasing brand name recognition to a specified level; improving customer perception of the company as an environmentally friendly company, i.e., a green company; implementing a web-based option for consumer purchasing; or any one of many other possible candidate goals. Those candidate goals are then given to an evaluator to evaluate. The evaluator can evaluate at least some of the various options using a set of unique Value Targeting (VT) computer tools which have been developed to enable an organization to execute a shareholder value analysis. The VT tools includes a database containing data from thousands of companies. That data includes a variety of metrics including price, earnings, capitalization, debt to equity ratio, and many other metrics. Using the tool the evaluator can select various similar companies and compare them to other companies, and view the differences between the selected companies in the selected metrics and shareholder value. The evaluator can then make an evaluation of the increased value to the company that would be obtained by achieving each of the various candidate goals proposed by the board. For example, if the company is an aluminum manufacturer, the evaluator can select different aluminum manufacturers to analyze, compare the companies on the bases of various metrics and develop an educated feel for how much value will be added to the company by achieving the selected goal, such as a reduction in the average days of sales outstanding, or the day supply of inventory. Within the tool the companies within the database are classified and selectable according to the type of business that they are in. The database includes a number of metrics regarding those companies to enable those companies' operations and performance to be compared using a number of differentiating criteria. Thus, the tool allows side-by-side comparisons of companies in similar business, so that a user can easily determine how the target company has performed historically against peer companies.

In another aspect, an embodiment of the present invention includes a unique set of steps for value targeting. Those steps consist of (1) identifying opportunities to increase value, (2) defining key value drivers and opportunities, (3) testing the sensitivity of value drivers, and (4) defining and evaluating the target value strategy. In an embodiment constructed, the step of identifying opportunities includes the use of a web-based financial analysis program comparing various companies on the basis of various criteria. The step of defining key value drivers and opportunities includes the step of employing stock valuation templates and examples. The step of testing the sensitivity of value drivers includes the step of using value driver sensitivity analysis templates and examples. The step of defining and evaluating target value strategy includes the step of using a value strategy impact model.

In another aspect, an embodiment of the invention includes the recognition that setting absolute budgetary numbers may be unrealistic in a fast changing environment, and therefore budgets can advantageously include relative targets rather than absolute targets, and can also include non monetary targets.

Other features and advantages of the invention can be found in the detailed description below.

BRIEF DESCRIPTION OF THE DRAWINGS

FIG. 4 is an exemplary screen shot of the target/comparison companies select screen within a web-enabled financial analysis tool according to one embodiment of the present invention.

FIG. 5 is an exemplary screen shot of the metric select screen within the financial analysis tool.

FIG. 6 is an exemplary screen shot of a tabular printout of a comparison of one target company to one comparison company.

FIG. 9 is an exemplary screen shot showing a graphical bar chart comparison of several different companies over several different years, on the basis of a third metric, as well as the select sequence by which a user arrives at that chart.

Figure 11:
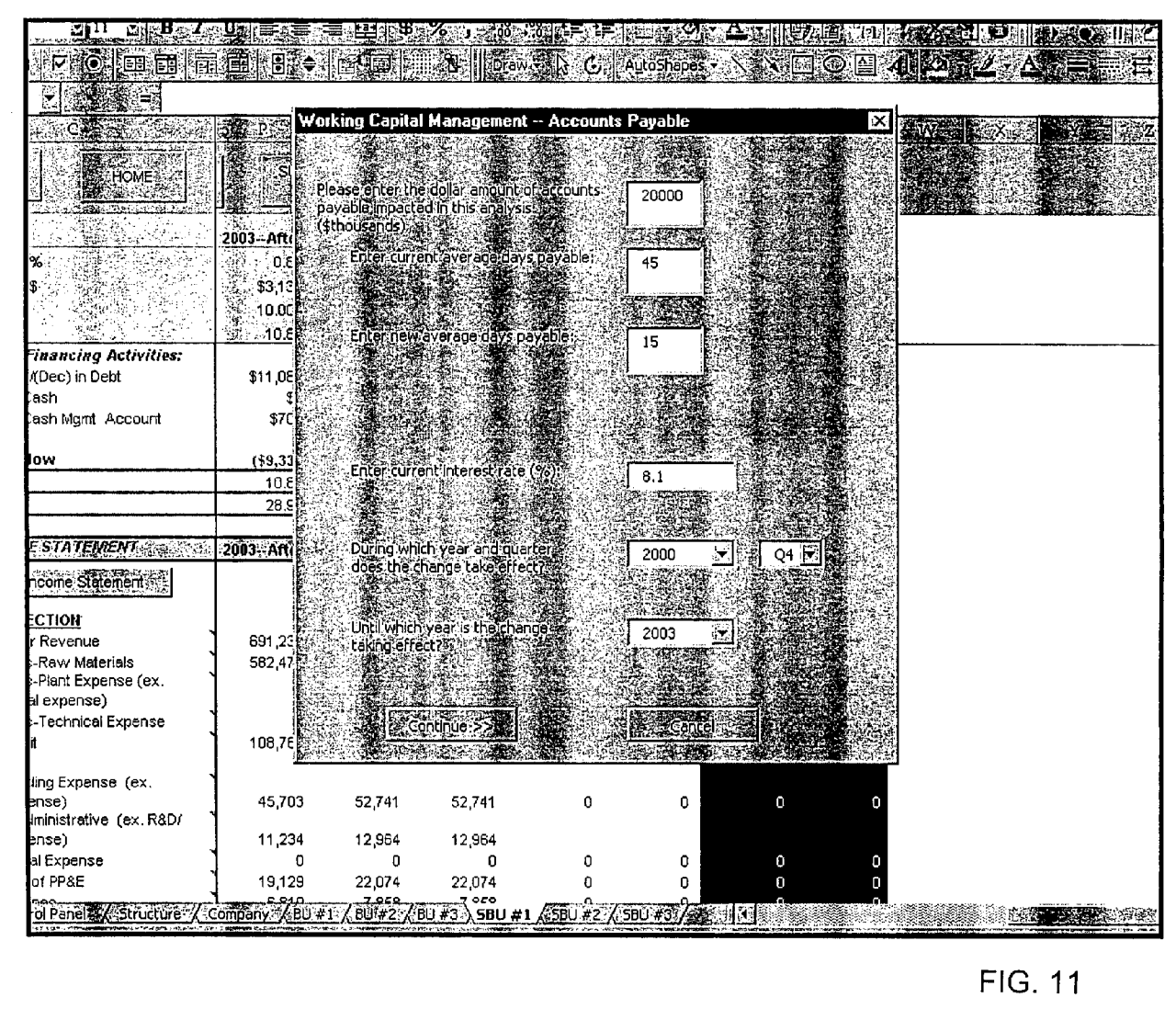

FIG. 11 is an exemplary screen shot showing a second step of the Value Strategy Impact Model according to an embodiment of the invention, in which the software prompts a user to input certain statistics and assumptions regarding a chosen strategy.

Figure 12:
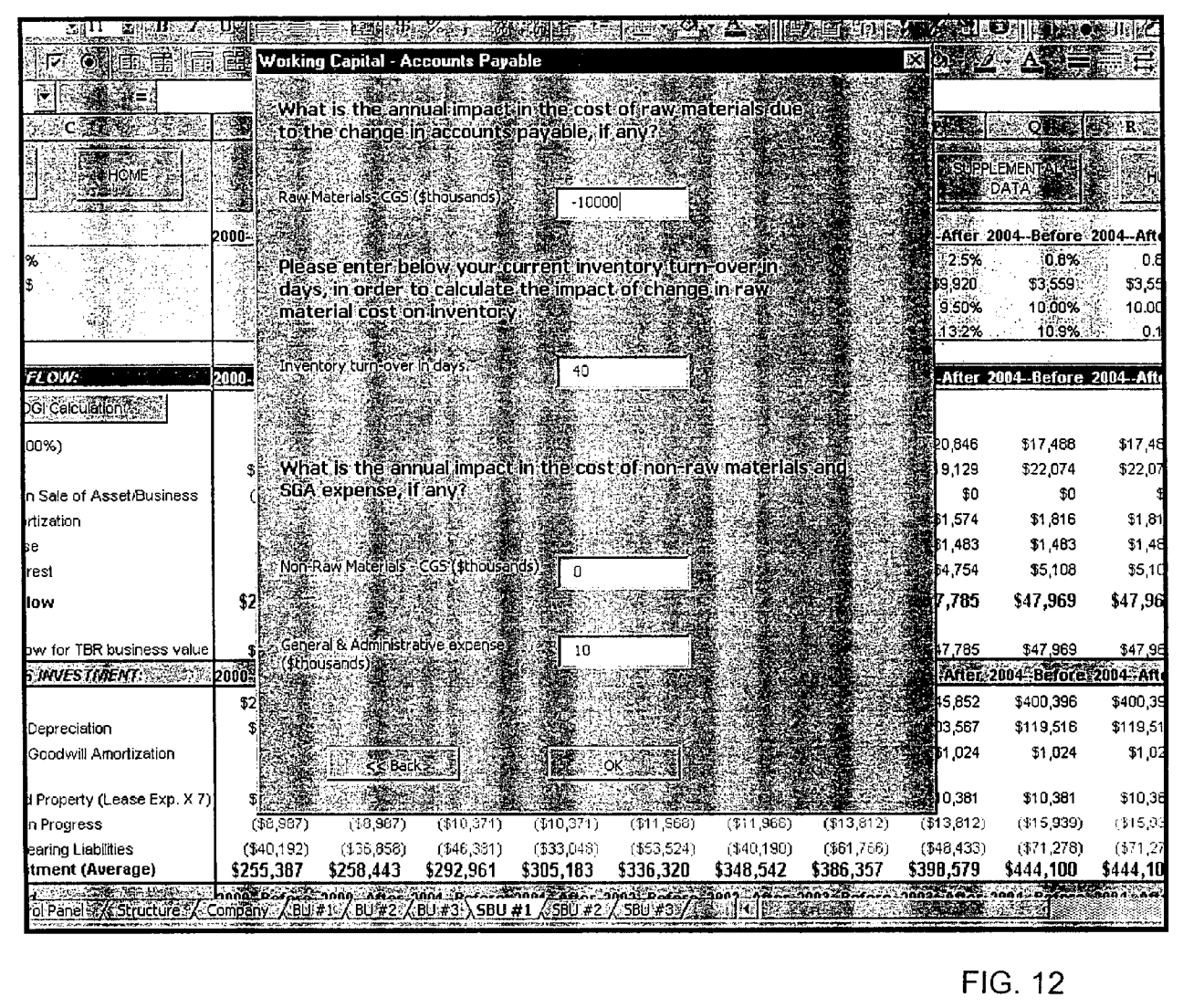

FIG. 12 is an exemplary screen shot showing a third step of the Value Strategy Impact Model according to an embodiment of the invention, in which the software prompts a user to input a second set of statistics and assumptions regarding a chosen strategy.

Figure 13:
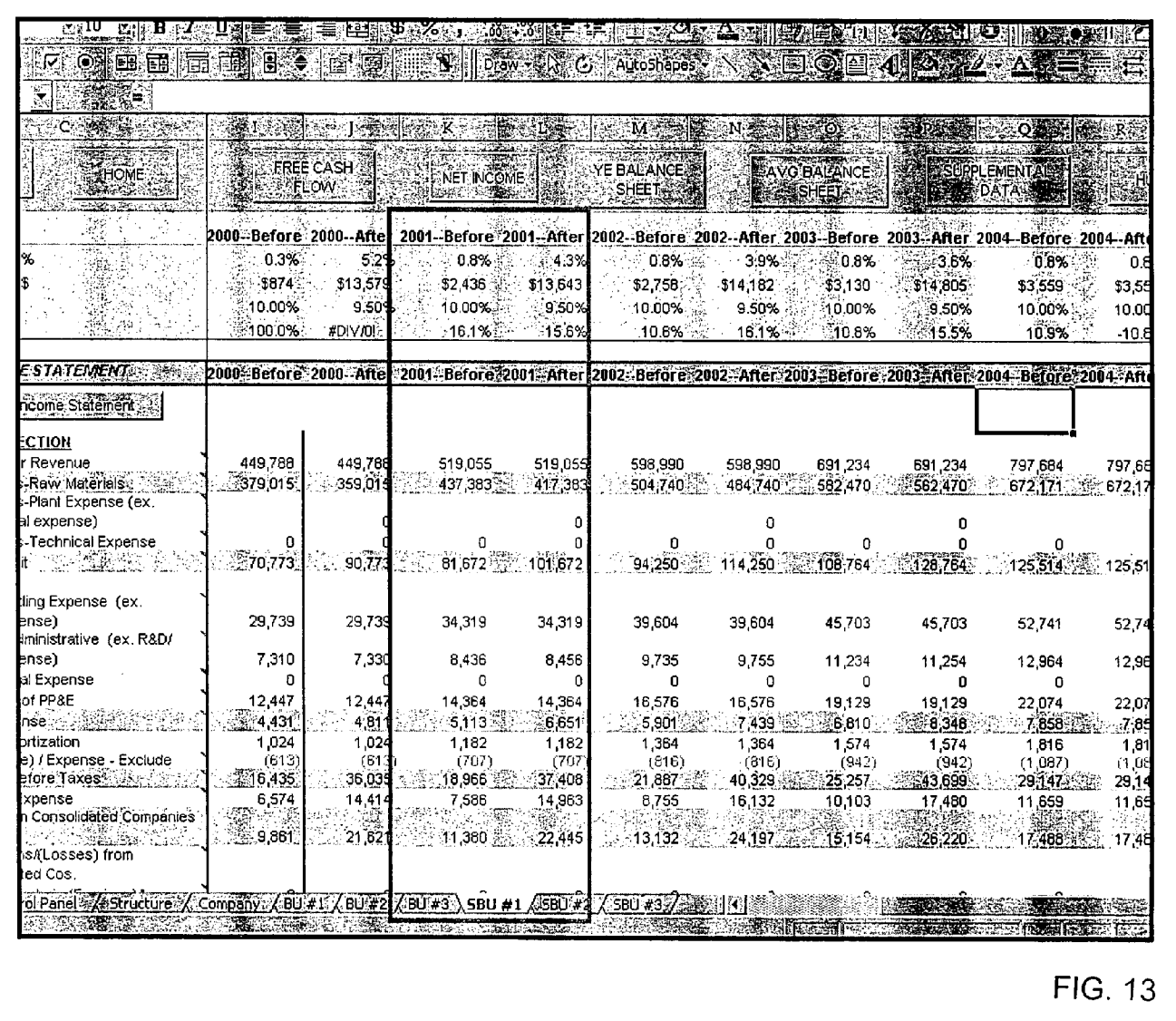

FIG. 13 is an exemplary screen shot of the Value Strategy Impact Model according to an embodiment of the invention, showing various inputs and outputs of the model.

FIG. 14 is an exemplary screen shot of the Value Strategy Impact Model according to an embodiment of the invention, showing figures for operating activities, investing activities, and financing activities.

Figure 15:
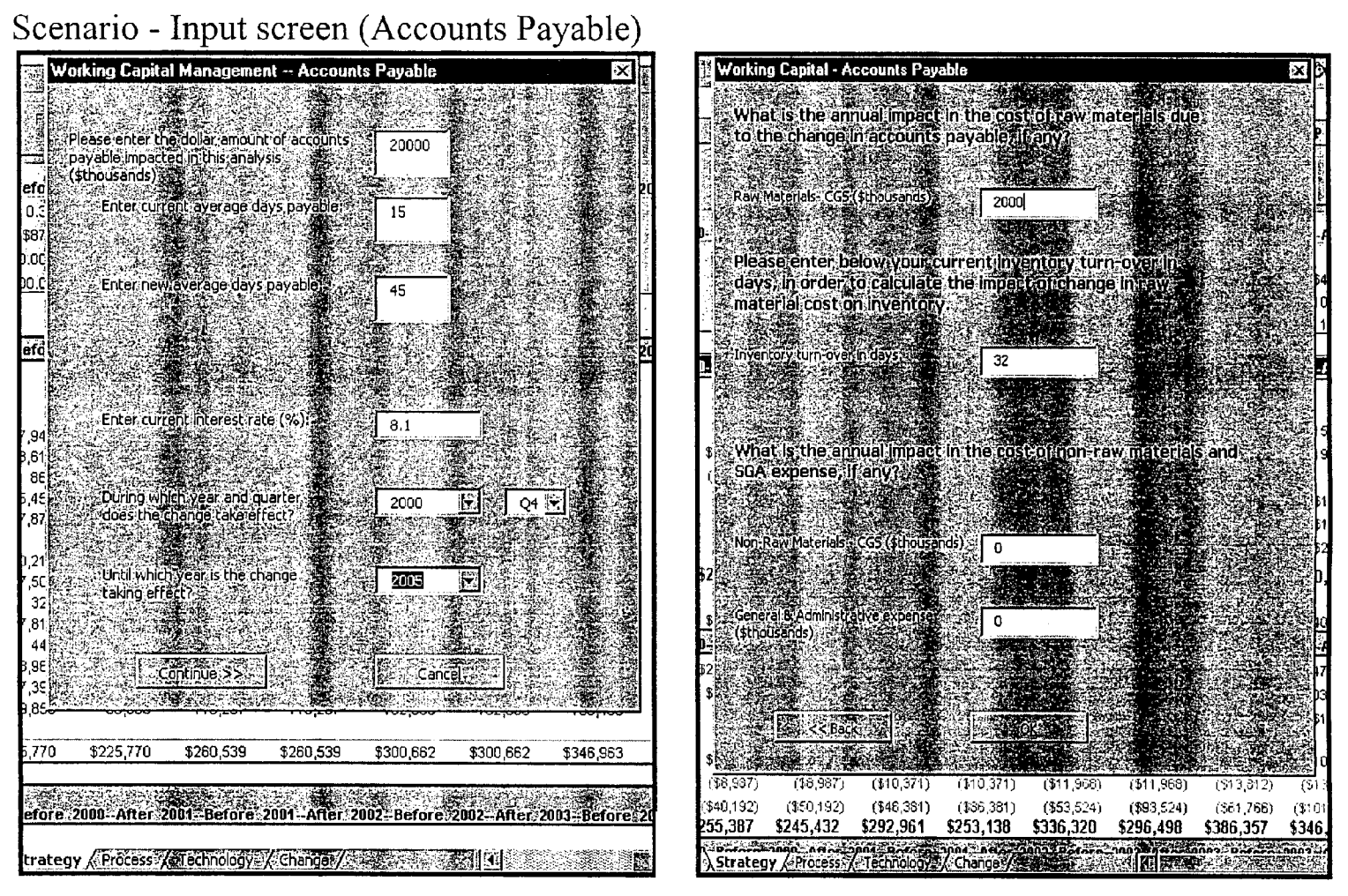

FIG. 15 is an exemplary screen shot of the Value Strategy Impact Model according to an embodiment of the invention, showing certain prompting and inputs relating to a chosen accounts payable strategy.

Figure 16:
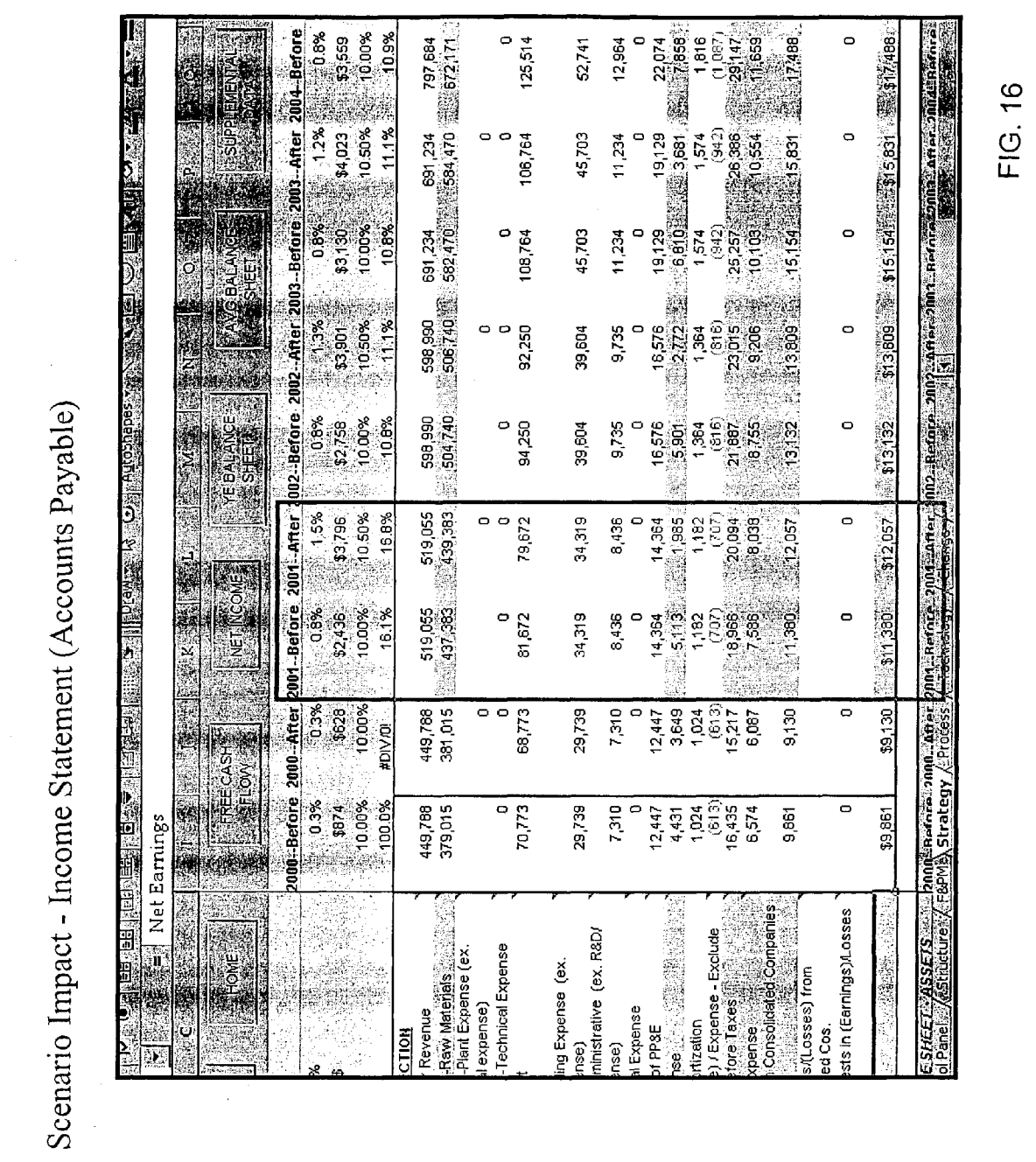

FIG. 16 is an exemplary screen shot of the Value Strategy Impact Model according to an embodiment of the invention, showing an income statement for an accounts payable strategy.

FIG. 17 is an exemplary screen shot of the Value Strategy Impact Model according to an embodiment of the invention, showing a balance sheet for an accounts payable strategy.

FIG. 18 is an exemplary screen shot of the Value Strategy Impact Model according to an embodiment of the invention, showing cash flows for an accounts payable strategy.

Figure 19:
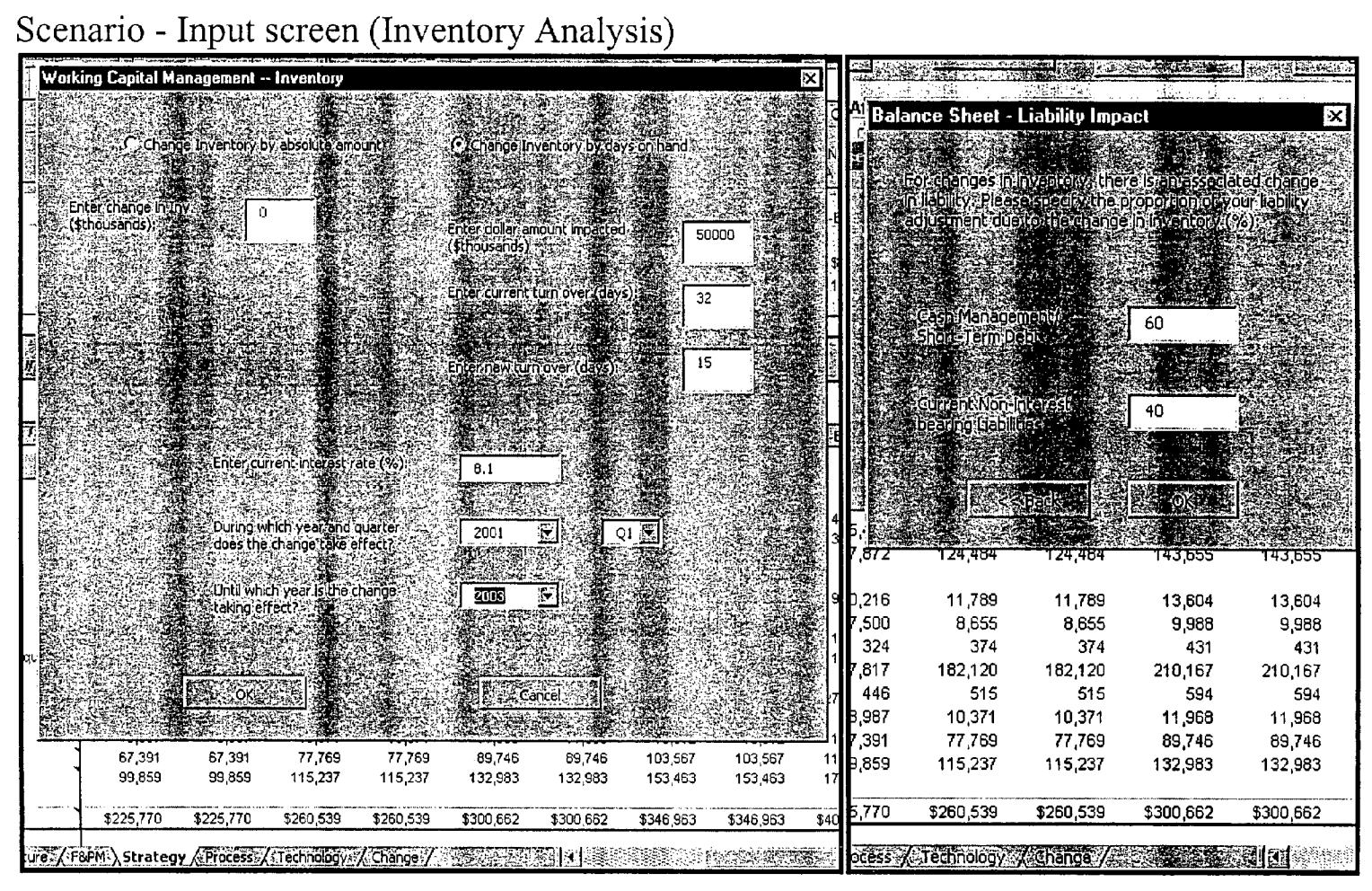

FIG. 19 is an exemplary screen shot of the Value Strategy Impact Model according to an embodiment of the invention, showing prompts and inputs for an Inventory Analysis strategy.

Figure 20:
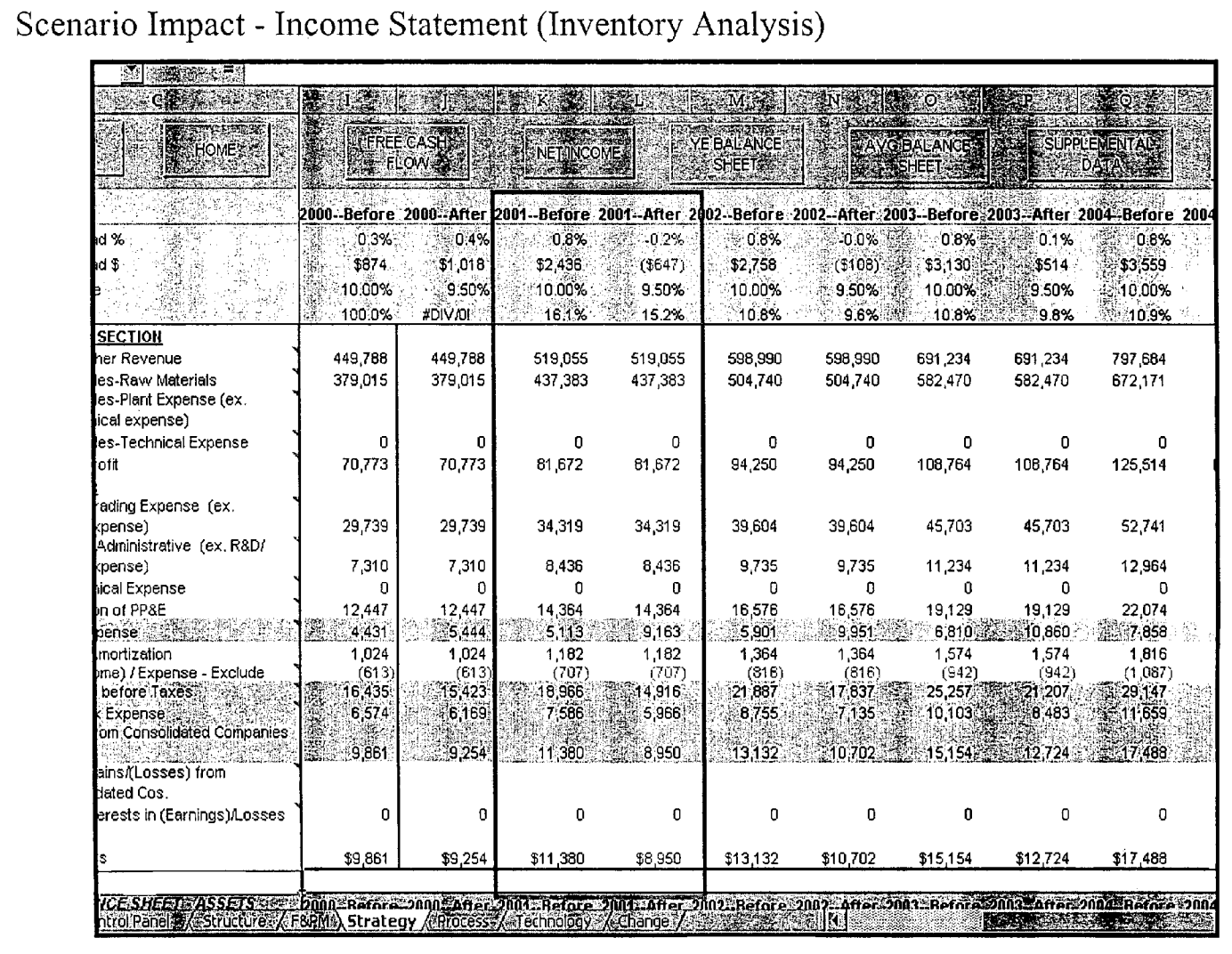

FIG. 20 is an exemplary screen shot of the Value Strategy Impact Model according to an embodiment of the invention, showing an income statement for an inventory analysis strategy.

FIG. 21 is an exemplary screen shot of the Value Strategy Impact Model according to an embodiment of the invention, showing a balance sheet for an inventory analysis strategy.

DETAILED DESCRIPTION OF EXEMPLARY EMBODIMENTS

Figure 1:
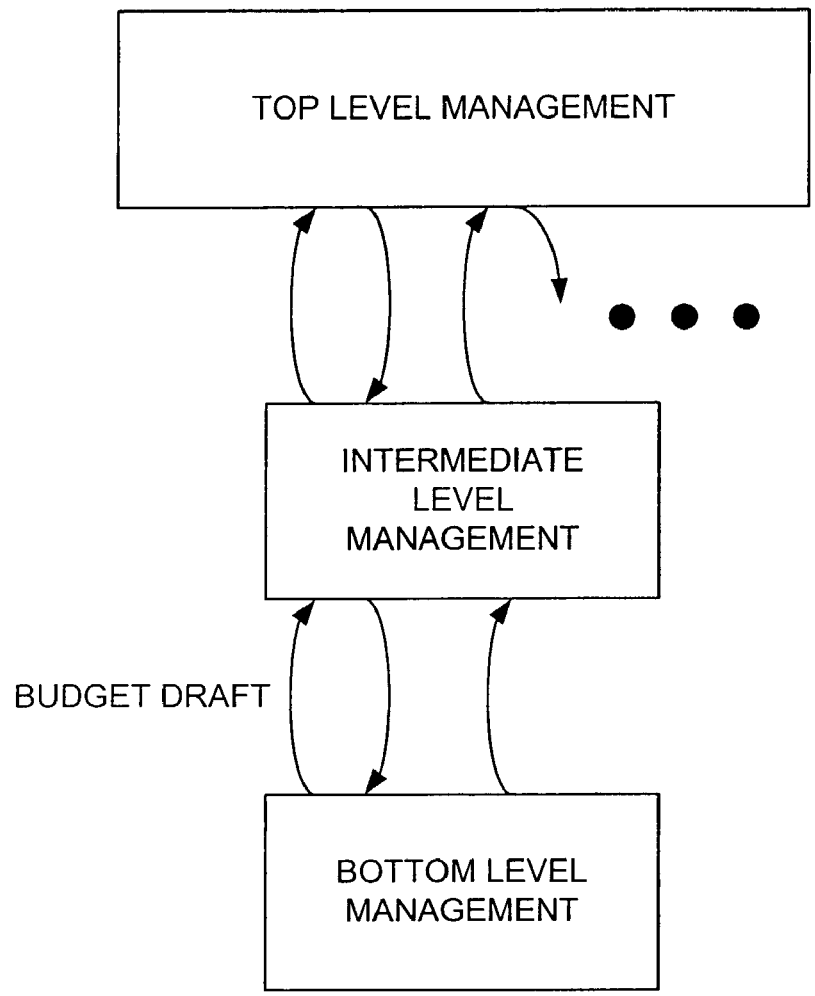
FIG. 1 is a conceptual flow diagram of the traditional prior art budgeting process.

According to the conventional method of budgeting depicted in FIG. 1, managers at the bottom levels of an organization would propose budgets for their departments or sub-departments, flow those budgets up to the next level where the budget would get consolidated with budgets from other levels, and on up the chain multiple levels until a master budget finally reached the board of directors, chief financial officer, or other budget-making authority. The budgets would be based, at least in part, on the lower level managers' educated guesses of what strategies, tactics, and other programs, expenditures, and/or purchases the board or other high level budget making authority within an organization would support. The board would examine the budget, cut out entirely some programs, initiatives, expenditures, etc., cut back on others, and reflow the budget back down. The managers at all levels would have to rework the budgets for their areas of the organization, and flow the budget back up again through multiple levels to the board. This process could be iterated several times. This iterative process was based to a significant extent on guesswork, and was time consuming and expensive.

Figure 2:
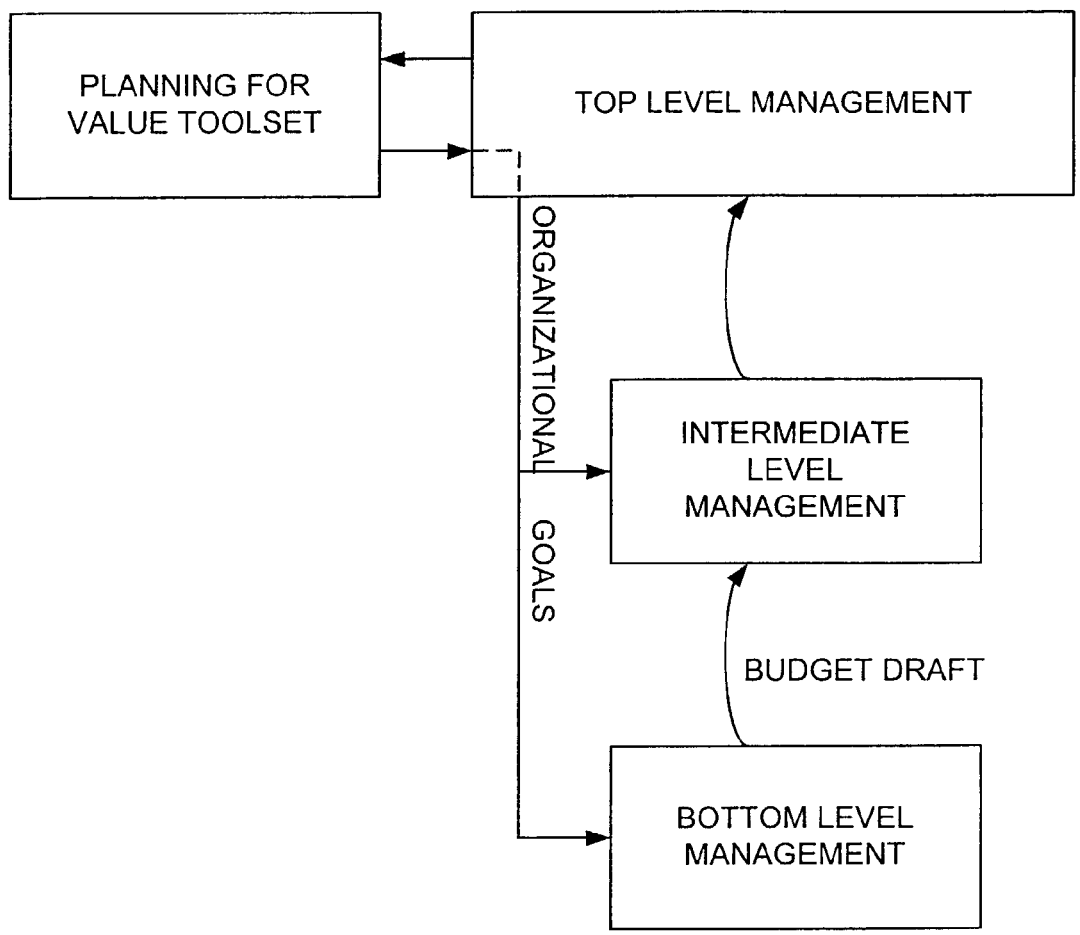
FIG. 2 is a conceptual flow diagram of the planning for value budgeting process according to an embodiment of the present invention.

FIG. 2 is a conceptual flow diagram of the planning for value budgeting process according to one aspect of one embodiment of the present invention. In this aspect, the invention improves the traditional process by allowing high level management such as the head of the finance department or the board of directors to select one or more target strategies that will add significant value to a company, and flow those target strategies down to various budget-setting managers and departments within the organization, such that the budget-setting managers can prepare their draft budgets with confidence that the board will support the major targets and initiatives which the budget represents. In this method, much of the guesswork and consequent iterative reworking of the budget is taken out of the budget and planning process. At the high management level, strategic planning is performed to identify value-adding and manageable organizational targets from among a set of possible targets. How the targets are selected is another aspect of the invention which will be described in detail further below. After the strategically planned targets are selected, those targets are communicated downward within the organizational hierarchy to various hierarchical management levels below. With the strategically planned targets having been predefined and preselected, the budget-setting managers at the lower levels of management can prepare their budgets knowing that the strategies and tactics which will be reflected in the budgets that they draft will be strategies and tactics which the board will support, because it is the board or other high level management or authority which selected them and mandated them. For purposes of this discussion, high level management within the organization can include but is not limited to the board of directors, the head of finance, the chief executive officer, the chief operating officer, and the like; it also includes any person or department who reports to foregoing, whether that person or department be an in-house employee or department or an outside consultant working under contract to the organization.

For example, if the board concludes that reducing the on-hand inventory is a value-adding tactic for reducing capital tied up in inventory, then the low level managers can know that the board will support sound tactics for reducing inventory, such as new information technology to implement just-in-time ordering, manufacturing, and assembly. Once the targets have been set, the budget spreadsheets, which are normally distributed in software form, are distributed throughout the organization. The budget spreadsheets contain numerous blocks such as zeroes or other placeholder numbers or items for budget setting managers to populate with their proposed budgetary numbers, in accordance with the preselected targets. Because the budgets should be responsive to the strategically chosen targets, the budget forms are not completed or preferably not even substantially completed until the strategically chosen targets have been flowed down to the budget setting managers. In another embodiment, the budget forms are not even provided to the budget setting managers until the strategically chosen targets have been appropriately communicated to the budget setting managers. The budgets may even explicitly reflect the selected targets, such as by including rows and columns including descriptions of the targets or tasks and subtasks for achieving the targets, and placeholders for the budget setting managers to fill in according to the expected materials costs, vendor costs, labor costs, and timelines for implementing the selected targets. From their very inception, therefore, the budget forms reflect and embody the chosen targets and cause budget setting mangers to focus on the value creating target strategies. The resulting budgets are substantially driven by, and substantially reflect, the selected strategically planned targets. This helps to drive a value-centric approach to planning deep within the culture of the organization.

Once the managers have populated the budgets with numbers that reflect and implement the targets chosen by the board, the budgets are then flowed upward within the organizational hierarchy, consolidated, and given to the board for review. It will be noted that the target setting level need not necessarily be the board, and the budget reviewing level need not necessarily be the board either, but the board will be referred to as a convenient shorthand to include any appropriate high level managerial function within the organization. After the consolidated budgets have been flowed upward to the board, the board can then review the draft budgets to ensure that they properly reflect the targets chosen by the board, that they are financially sound, and are otherwise in accordance with sound business practices according to criteria which are well known within the art of planning, budgeting, and management. The board makes any changes that it believes appropriate to the draft budgets. A valuable feature of this embodiment of the present invention is that, because the board has preselected the targets, there should be only relatively minor discrepancies between the draft budgets which are then flowed upward and the budgets as amended by the board after the board's review of, and amendments to, those draft budgets. The amended budgets can then be flowed downward again if necessary for redrafting and final adjustments and realignment by the lower level budget setting managers. After the budget is finalized, the performance of the organization can then be measured against the selected targets. For example, the organization can obtain feedback by measuring whether it has effectively accomplished the desired reduction in the days of extra inventory, the average numbers of days of accounts receivable, the brand name recognition of selected brands, etc., and incorporate any necessary changes in order to more fully align the strategies and tactics of the organization with the selected value adding goals. The process may be repeated each cyclical budget cycle, which is typically annually but may be of any other periodicity. The process can also be used with non-cyclic budgeting such as with rolling budgets. By repeating the process, the organization's culture is fundamentally changed to focus all levels of the organization on creating long term value for shareholders.

Non-monetary goals can also be incorporated into the budget and included within budget reports. For example, if one of the strategically planned goals is to improve brand name recognition among supermarket shoppers for a particular breakfast cereal brand, then the periodic budget and financial reports which are prepared periodically throughout the budget cycle so that management can see whether the organization is "on budget" for the year, can also include the results of supermarket surveys taken to gauge brand name recognition for that brand. In this way, management can view within one document and even one page side-by-side comparisons of the dollars that were expected to be spent, what is the variance between dollars expected to be spent and dollars actually spent, what brand name recognition was expected to be achieved, and what is the variance between brand name recognition expected to be achieved and brand name recognition actually achieved. Similarly, other non monetary goals as well as monetary goals can be incorporated within budgets and periodic reporting, in order to embed within the organization's culture a focus on the concepts of, and the links between, strategy, planning, execution, and performance measurement, all toward the goal of increasing shareholder value.

The improved budgeting and planning method described herein can reduce the number and scope of changes and iterations necessary within the budget process, thus reducing the calendar time and labor as measured by person-hours needed for an organization to arrive at a budget for the following year or budget period, and thus resulting in cost savings. Additionally, by reducing the time to plan and implement strategies and tactics, the organization is more nimble and is able to respond more quickly and effectively to changing conditions within the marketplace.

Figure 3A:
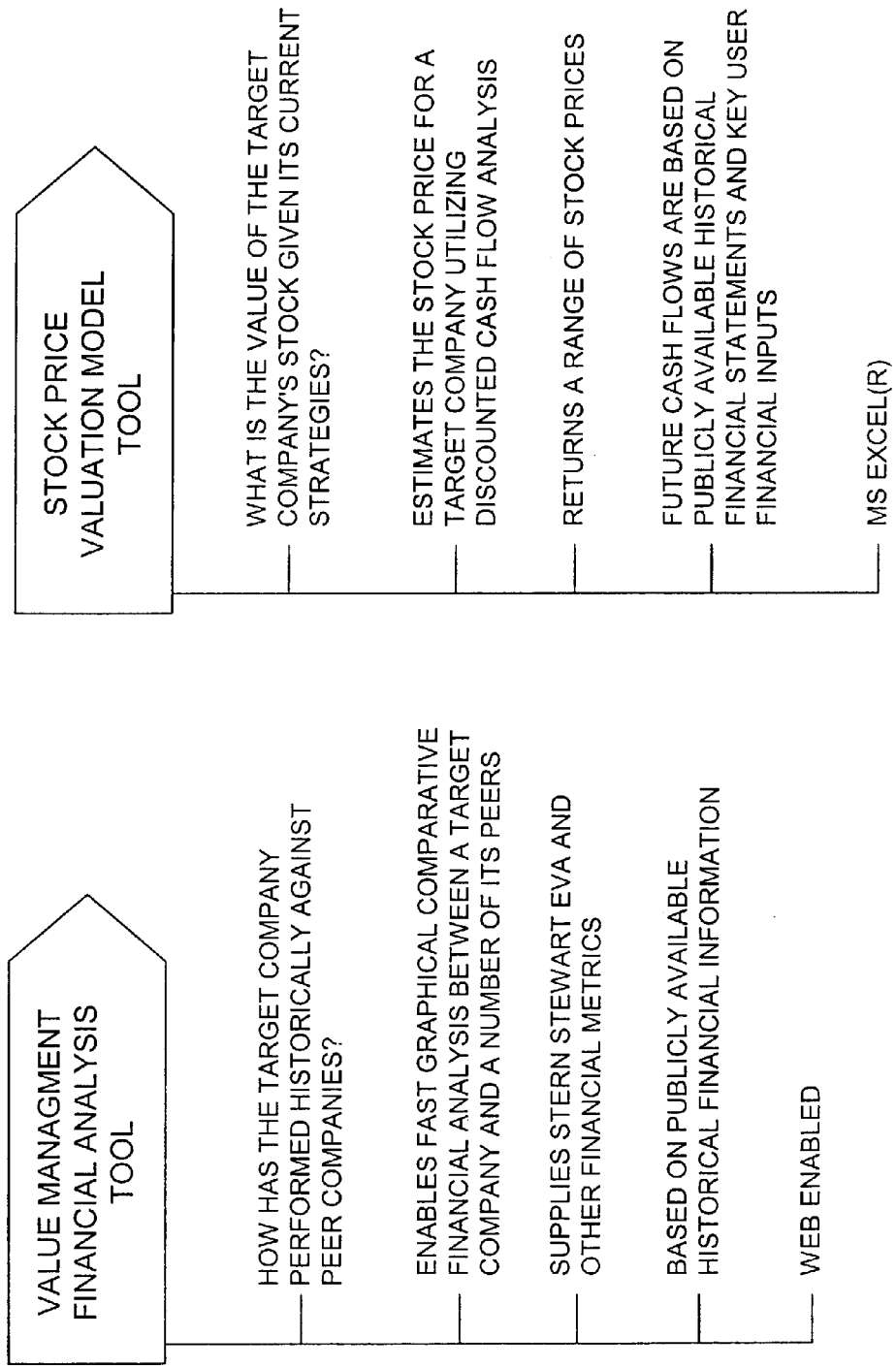
FIG. 3 presents an overview of four computer tools that have been developed to allow a user to select value-adding strategies according to an embodiment of the present invention.
Figure 3B:
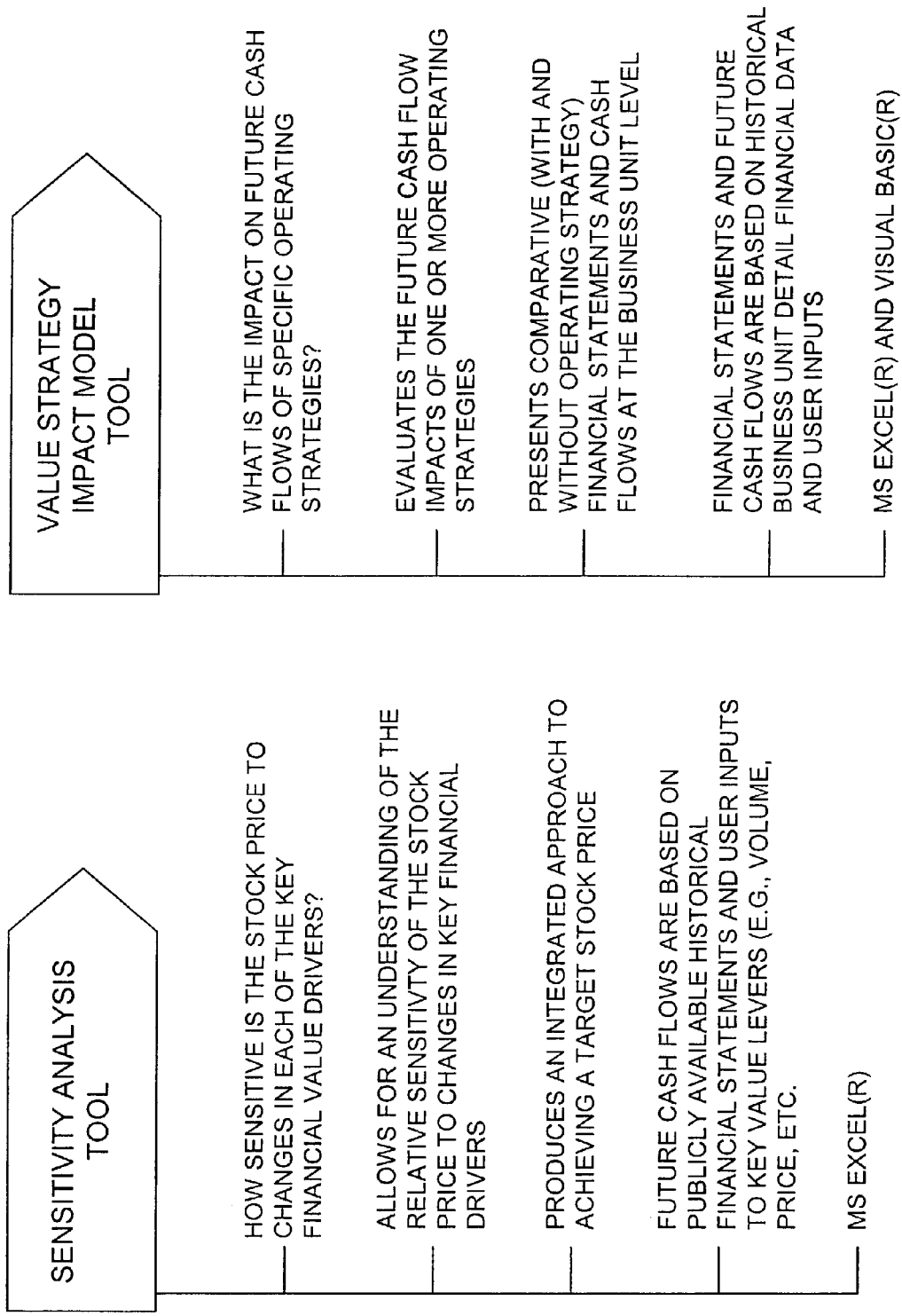

The software tools that have been developed to accomplish certain aspects of the present invention will now be discussed. FIG. 3 presents an overview of four computer tools that have been developed to allow a user to select value-adding strategies according to the present invention.

The first unique software tool developed will be called the Value Management Financial Analysis Tool (VMFAT). The purpose of the VMFAT is to enable fast financial comparative analyses between a target company and a number of its peer companies. The user first decides which companies to compare. The user can select from classes of companies based upon their industry and country, and then select the target company that he wishes to examine and the single comparison company or multiple comparison companies to which he wishes to compare the target company. FIG. 4 is an example of a screen shot of the web-based VMFAT tool, showing that the user has selected USAir as the target company and Delta Air Lines as the single comparison company. The user is then presented with a menu of key metrics from which to select. FIG. 5 is an exemplary screen shot showing the menu of metrics from which the user selects. The user can elect to see the resulting comparison in either graphical or numerical data form, can select a number of different companies to compare side-by-side simultaneously, can compare the results over a number of selected years, and can compare the results to either the industry average or the sector average. FIG. 6 is an exemplary screen shot of a tabular printout of a comparison of one target company to one comparison company, over a number of different years.

Figure 7:
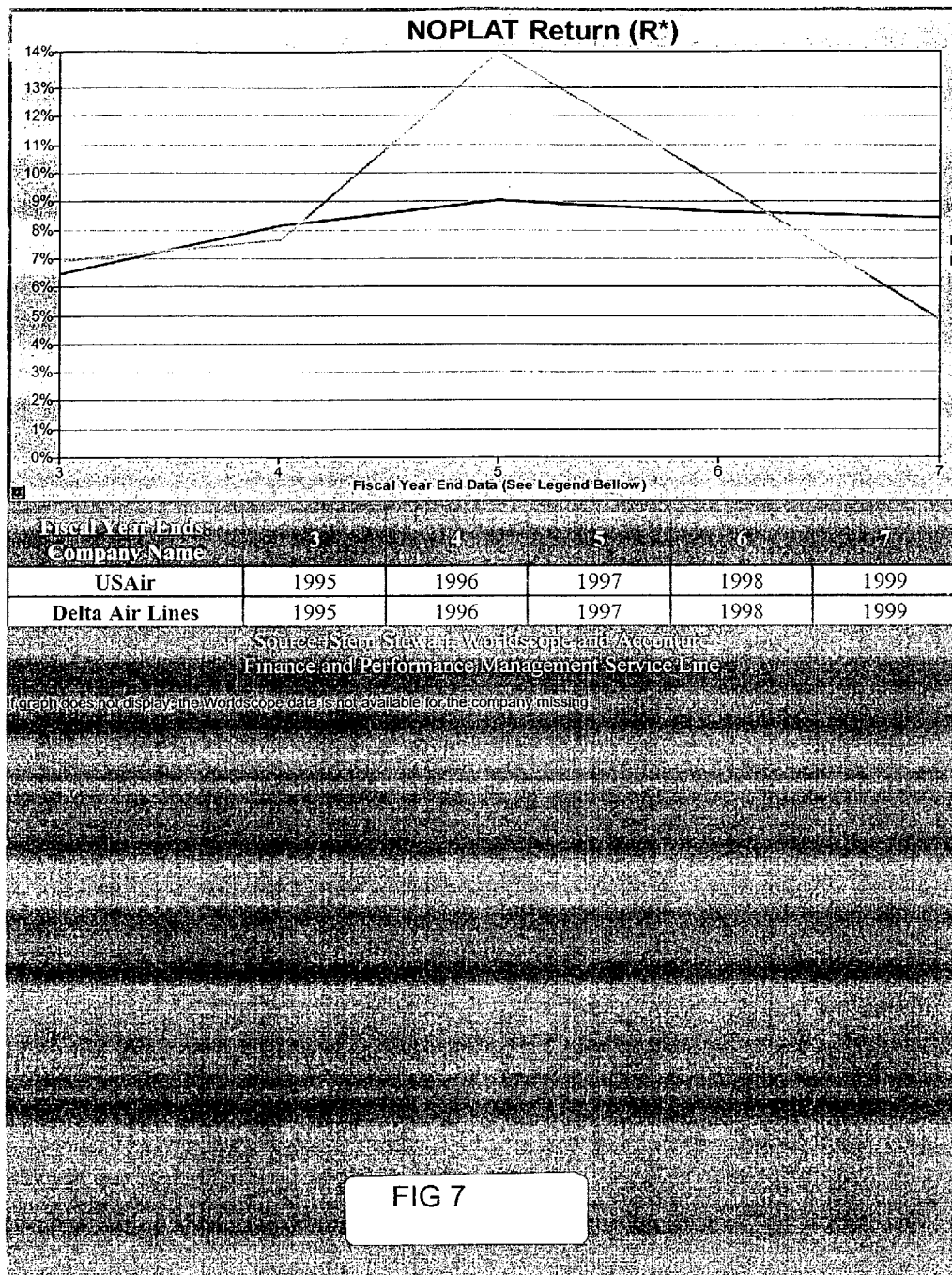
FIG. 7 is an exemplary screen shot of a graph of a first metric of a target company to a comparison company using the financial analysis tool.

FIG. 7 is an exemplary screen shot of a graph of a first metric of a target company to a comparison company using the VMFAT tool. In this case, the screen displays two selected companies on the basis of Net Operating Profit Less Adjusted Taxes (NOPLAT).

Figure 8:
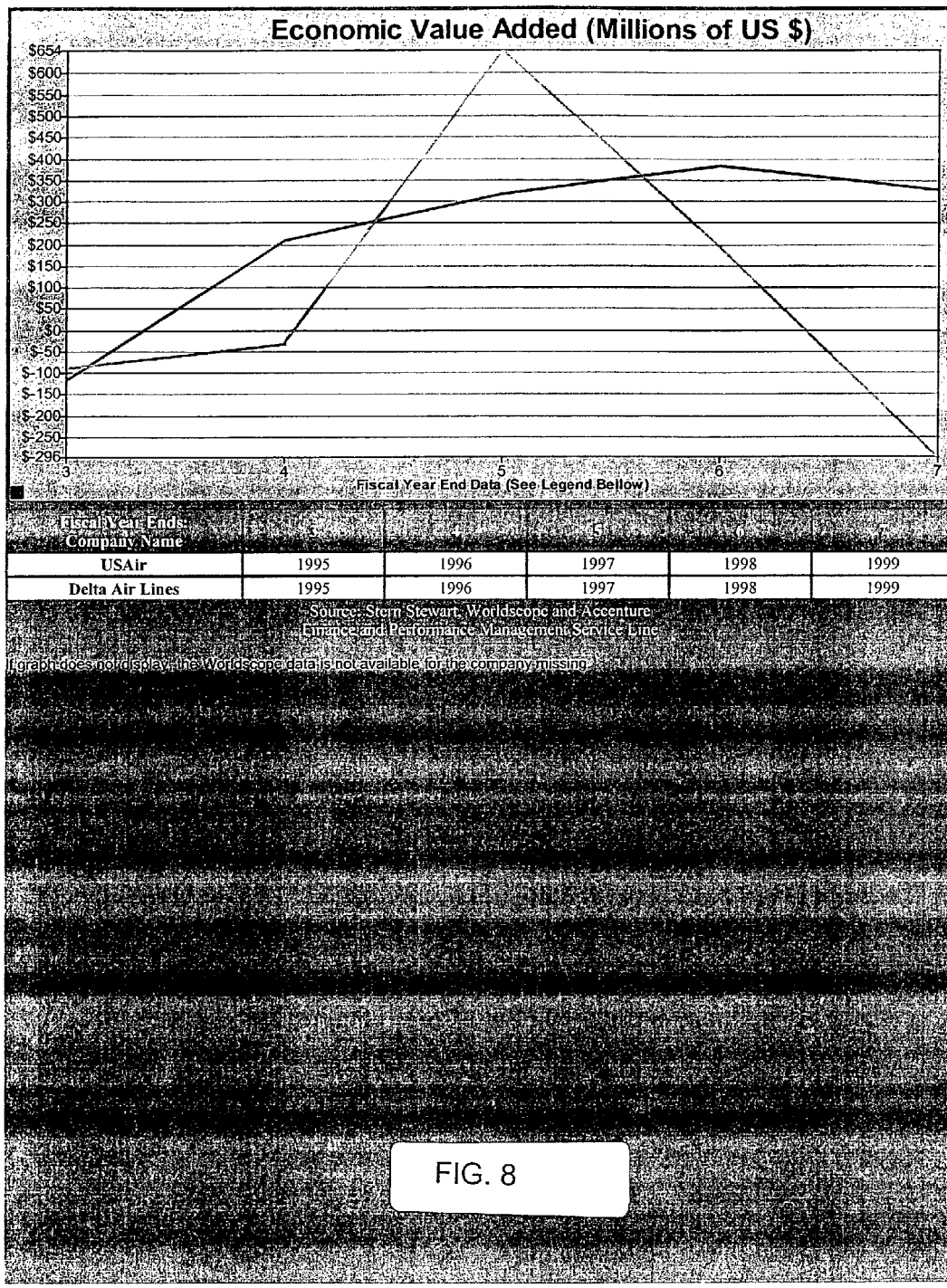
FIG. 8 is an exemplary screen shot of a graph of a second metric of the target company to the comparison company using the financial analysis tool, comparing total economic value added for each of the two selected companies.
Figure 10:
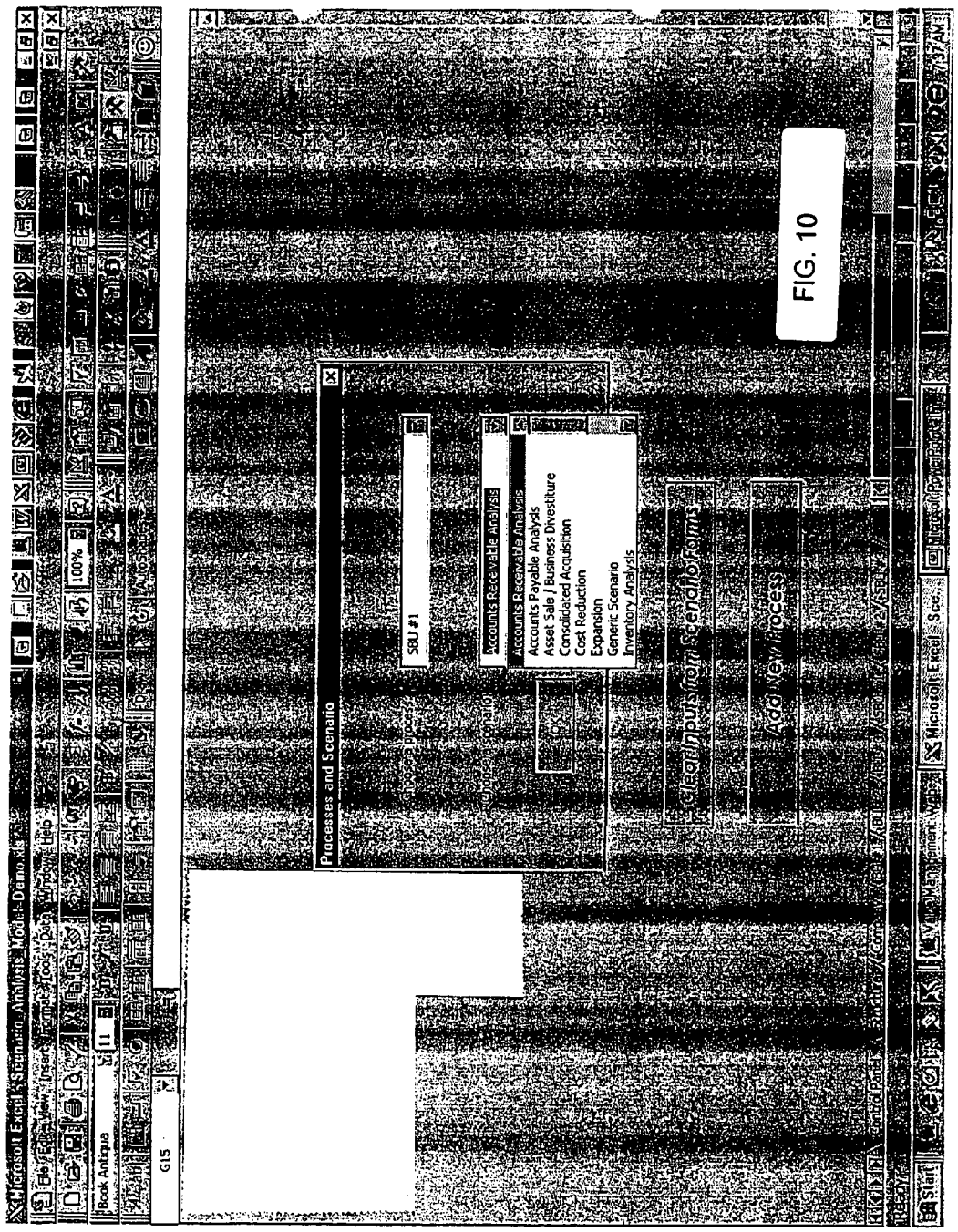
FIG. 10 is an exemplary screen shot showing a first step of the Value Strategy Impact Model according to an embodiment of the invention, in which a user chooses a process and a scenario for analysis.

FIG. 8 is a exemplary screen shot of a graph of a second metric of the target company to the comparison company using the VMFAT tool. In this case, the screen displays the two selected companies on the basis of economic value added for each of the two selected companies.

The displays of the different metrics can be presented either by presenting first one metric, then the user clearing the display and requesting the second metric to be displays, or they can be displayed simultaneously, i.e., a single screen showing graphs of multiple variables, with appropriate respective scaling and labeling of the axes.

FIG. 9 is an exemplary screen shot showing a graphical bar chart comparison of several different companies over several different years, on the basis of a third metric, as well as the select sequence by which a user arrives at that chart.

By comparing the selected companies on the bases of various metrics, the user can develop an educated feel for which factors played a role, and to what extent, in development of particular companies' gain or loss of value. The user can therefore use the VMFAT to help select which candidate goals are likely to return the most value. The tool also allows a user to develop an educated feel for what goals are achievable, i.e., manageable, and which goals are not. For example, if the target company is considering an initiative to reduce its on-hand inventory from 30 days to 20 days, and by using the tool is able to observe that several of its competitor companies who are outperforming it in the marketplace have already reduced their on-hand inventory to approximately 15 days, then the user of the tool can be reasonably confident that a reduction of on hand inventory to 20 days is achievable. On the other hand, if no competitor has accomplished a reduction significantly below 30 days, then that provides some indication that reducing on hand inventory to 20 days is, for some reason, a relatively unmanageable goal.

Another way of using the VM FAT tool is to analyze the relative performance of different companies that are similarly situation, to help identify which companies have performed the best as a first step in identifying what factors played a role in that performance. For example, if the target company is in the airline industry, the user could use the VMFAT to review the performance of various airlines and quickly see that one American and one European airline have significantly outperformed their peers in net revenue growth. That information would lead the user to begin searching externally for factors that may have contributed to the relative increase in net revenue. By researching what various strategies those two companies are implementing, the user might observe that both of those airlines had significantly improved their on-time records and had begun advertising those improved and now-superior on-time records. This would lead the user to conclude that, if other factors appear to be equal, improving on-time record and advertising a superior record may lead to improved net revenue.

In the embodiment constructed, the tool produces a number of financial and economic metrics over a five-year analysis time horizon. It contains standardized historical financial information (Income Statement, Balance Sheet, and Cash Flow Statement), EVA® (Economic Value Added) data and miscellaneous information regarding a company. Comparative graphs across the metrics can be viewed and copied to other documents or presentations via screen print and cropping functions. Additionally, the raw data and back-up financial statements can be downloaded into EXCEL® or other spreadsheet or similar program for further off-line analysis. In the embodiment which has been constructed, the VMFAT includes a database of over 9000 companies and uses 19 separate metrics. Those metrics include: Market Value Added, EVA®, NOPLAT Return less the Weighted Average Cost of Capital, NOPLAT Return, Weighted Average Cost of Capital, Sales over Average Capital, EVA® Margin, NOPLAT Growth, Revenue Growth, Growth Margin %, Sales, General & Administrative Expense as a % of Sales, EBITDA Margin, Working Capital Effectiveness, Cash To Cash Cycle Time, Days Sales Outstanding, Days Supply of Inventory, Days Payables Outstanding, Capital Expenditure Ratio, and Cash Conversion Efficiency.

The VMFAT may be accessible over a secure Internet connection, an in-house network, or other networks or stand-alone computers. In one embodiment the VMFAT is accessible over the Internet and the worldwide web via a password so that the tool can be used simultaneously by various users at various locations throughout the world. Thus, multiple VMFAT users can obtain fast comparative financial analyses between a target company and a number of its peers, enabling the users to obtain both a quantitative and a qualitative feel for how changing one parameter or a number of parameters might affect the operation and market performance of a company. The VMFAT operates on a SQL server database that is refreshed with annual financial statement information from FactSet Research Systems, Inc. on a daily basis. FactSet Research Systems, Inc., of Greenwich, Connecticut is a supplier of online integrated financial and economic information to the investment management and banking industries. EVA® data is purchased from financial data vendor Stern Stewart & Co. of New York, N.Y., as it comes available. The EVA® data is based largely on publicly available historical financial information. Stern Stewart & Co. is a consulting firm that specializes in EVA® calculations and frameworks. The VMFAT uses Stern Stewart EVA® and other financial metrics as selectable inputs and as outputs.

FactSet Research Systems, Inc. sources financial data for U.S. and non-U.S. companies from the Worldscope Global database available from Thomson Financial of New York, N.Y. The Worldscope database standardizes financial statement information to allow for comparisons across companies and historical analysis of financial data. However, differences in accounting standards and reporting practices across companies, industries and countries may lead to consolidation and standardization variations. The data is not a substitute for understanding the implications associated with financial reporting practices of a specific company, industry or company. Users should be cognizant of these differences to ensure reliable and consistent comparisons. Additionally, the nature of a company's business or industry may skew or distort some of the metrics provided by the tool. For example, working capital metrics (e.g. Working Capital Effectiveness, Days Supply of Inventory, etc.) are not applicable for financial service companies and therefore will not provide meaningful results. Furthermore, many conglomerates with large financial services arms may fall into this category. FactSet Research Systems, Inc.'s database uses a June through May fiscal year assignment system. Companies with a June through December fiscal year end have a fiscal year assignment of the current calendar year (e.g. November 1999 fiscal year end is assigned 1999). Companies with a January through May fiscal year end have a fiscal year assignment of the prior calendar year (e.g. April 2000 fiscal year end is assigned 1999).

Stern Stewart & Co. compiles EVA® data from publicly available information. They perform calculations and adjustments to derive their EVA® outputs. The extent of their adjustments is dependent on the availability and detail with which a company reports information. The amount of possible adjustments number in the hundreds; however, several key adjustments account for the majority. Due to the depth of their analysis, Stern Stewart & Co. generally completes their EVA® reporting a calendar year in arrears. *The Quest for Value* by G. Bennett Stewart, III, provides additional information about the methodologies and rationale used by Stern Stewart & Co. to compile the data, and is hereby incorporated by reference for its teachings of financial methodologies, calculations, and interpretation.

The web based VMFAT provides two sets of 19 performance metrics. One set, Economic Profit and Standard Financial Metrics, includes all the companies in the database. It relies primarily on data provided by FactSet Research Systems, Inc. The second set, EVA® and Standard Financial Metrics, is a subset of the total database that is currently made up of only the companies for which Stern Stewart & Co. provides reporting. The EVA® and Standard Financial Metrics are a blend of Stern Stewart and Factset data. Both sets provide key financial statement metrics, but they differ in the approach and calculation of EVA® and Economic Profit. In lieu of Stern Stewart data, the Economic Profit and Standard Financial Metrics calculate Market Value Added (MVA), Economic Profit, NOPLAT, Capital Invested and the Weighted Average Cost of Capital (WACC) utilizing information provided by Factset. The approach for calculating Economic Profit, while not as exhaustive as Stern Stewart, was pioneered by the classical economists (e.g. Keynes, Marshall, Smith). It captures the essence of Economic Profit, that is accounting for an investor's opportunity cost of equity. This can be interpreted as the implicit cost of foregone returns associated with an equivalent capital investment of similar risk. In both sets of metrics, calculations, definitions and interpretations are provided to give background and understanding.

Once the key value drivers are identified they are consolidated into a value-tree model. Once the value-tree model is established, additional software tools which will be described below are used to perform a sensitivity analysis to help define, evaluate and select strategies. The value-tree models can be tested by inputting actual historical company data and comparing the outputs with actual historical company performance. The selected strategies are then communicated within the company and performance and evaluation goals are set to reflect those strategies, thus establishing and embedding a supporting performance management framework into the organization to facilitate the implementation and delivery of the selected strategies.

A second software tool within the tool suite is the Stock Price Valuation Model Tool (SPVMT). The Stock Price Valuation Model is, in the embodiment constructed, a spreadsheet program implemented in a spreadsheet such as EXCEL® available from Microsoft Corporation of Redmond, Wash. It allows a user to estimate the value of a target company's stock given its current strategies. The tool estimates the stock price for a target company utilizing discounted cash flow analysis. It returns a range of stock prices, and predicts future cash flows based on publicly available historical financial statements and key user financial inputs. The SPVMT embodies standard financial calculations of a stock's expected value based on the cash flow that the company is expected to generate. Inputs include, for example, but are not limited to: working capital, value of current inventory including both tangible and intangible assets, depreciation and amortization, accounts receivable, accounts payable, growth in invested capital, capital expenditures, effective tax rate, debt load and debt interest rate, operating expenses, revenue, historic growth, other liabilities, other assets, terminal growth rate for the industry, discount rate, market risk premium, and number of shares outstanding. According to known financial calculations, the tool implements a discounted cash flow valuation model that includes forecasted future cash flows over specific time horizons that are discounted back to the present at an appropriate cost of capital, added to a terminal value calculation to determine the total value of the enterprise. Outstanding debt is then subtracted to arrive at an intrinsic value of the shareholders' equity which is divided by the number of shares outstanding to determine the intrinsic value of the stock.

The third software tool is the Sensitivity Analysis Tool (SAT). The SAT is also an EXCEL® or other spreadsheet type program. It allows the user to see how present and future discounted cash flows and hence stock price can be expected to change in response to changes in key financial drivers, and helps the user to understand the relative sensitivity of the stock price to changes in key financial drivers. For example, some of the financial drivers which a user can change in order to see the expected results on the stock price are accounts receivable, interest expense, cost of raw materials, administrative overhead, lease expenses, short term debt, long term debt, inventory, tax rates for operating income and operating loss, monetary inflation, average asset life, average asset age, deferred liabilities, The model uses standard financial calculations, with standard inputs, calculations, and outputs. It produces an integrated approach to achieving a target stock price. Within the model, future cash flows are based on publicly available historical financial statements and user inputs to key value levers, such as volume, price, etc. The sensitivity analysis model builds on a standard discounted cash flow model and incorporates a number of variables that are used as factors that impact free cash flow. This may include in appropriate cases sales volume, sales prices, manufacturing costs, distribution costs, SG&A costs, tax costs, working capital and capital expenditures. These items are customizable to tailor the model as appropriate for the company being analyzed and its business variables. For any particular case, the model should be built and finalized as a function of such variables. Then for any of the variables a user can perform a sensitivity analysis to determine, for example, that a 1% change in sales volume can have a 0.5% impact on shareholder value.

The fourth software tool is the Value Strategy Impact Model Tool (VSIMT). In the embodiment implemented it is written in a combination of EXCEL® and VISUAL BASIC®. The VSIMT allows the user to see the impact on future cash flows of specific operating strategies. It evaluates the future cash flow impacts of one or more operating strategies, presents comparative financial statements and cash flows at the business unit level, i.e., financial statements with and without the candidate operating strategy being assumed. In the model, financial statements and future cash flows are based on historical business unit detail financial data and user inputs. FIGS. 10-21 are exemplary screen shots illustrating inputs, outputs, flow, and operation of the VSIMT.

The VSIMT helps a user to quantify and analyze the impact of business decisions and value creation options in terms of value creation Free Cash Flows (FCF) and Economic Profit (EP). The "before" and "after" measures are reported comparing the impact on FCF and EP. Additionally, detailed income statements and balance sheets are also calculated for before and after. The tool assists the sensitivity analysis and helps quantify the impact of business decisions or value creation options on value creation metrics. Operating strategies are translated into numbers that can be entered into an income statement and balance sheet represented within the model. Using the VSIMT, future cash flows can be estimated based upon operating strategies involving consolidated acquisition, non-consolidated acquisition, business divestiture, expansion, productivity improvement, revenue enhancement, cost reduction, changes in accounts receivable outstanding, accounts payable outstanding, inventory, trading position, or other strategies. The business scenarios encompass most business decisions that focus on revenue improvement, cost reduction, and asset efficiency. There is also an additional generic scenario which gives the user the option to analyze an initiative not specifically described in the form of scenarios. These initiatives can be combined either concurrently, but not clearing the previous scenario, or simultaneously using the generic scenario. A user can test one, two, three, or more of these various strategies and determine the expected resulting changes in cash flow.

Figure 22:
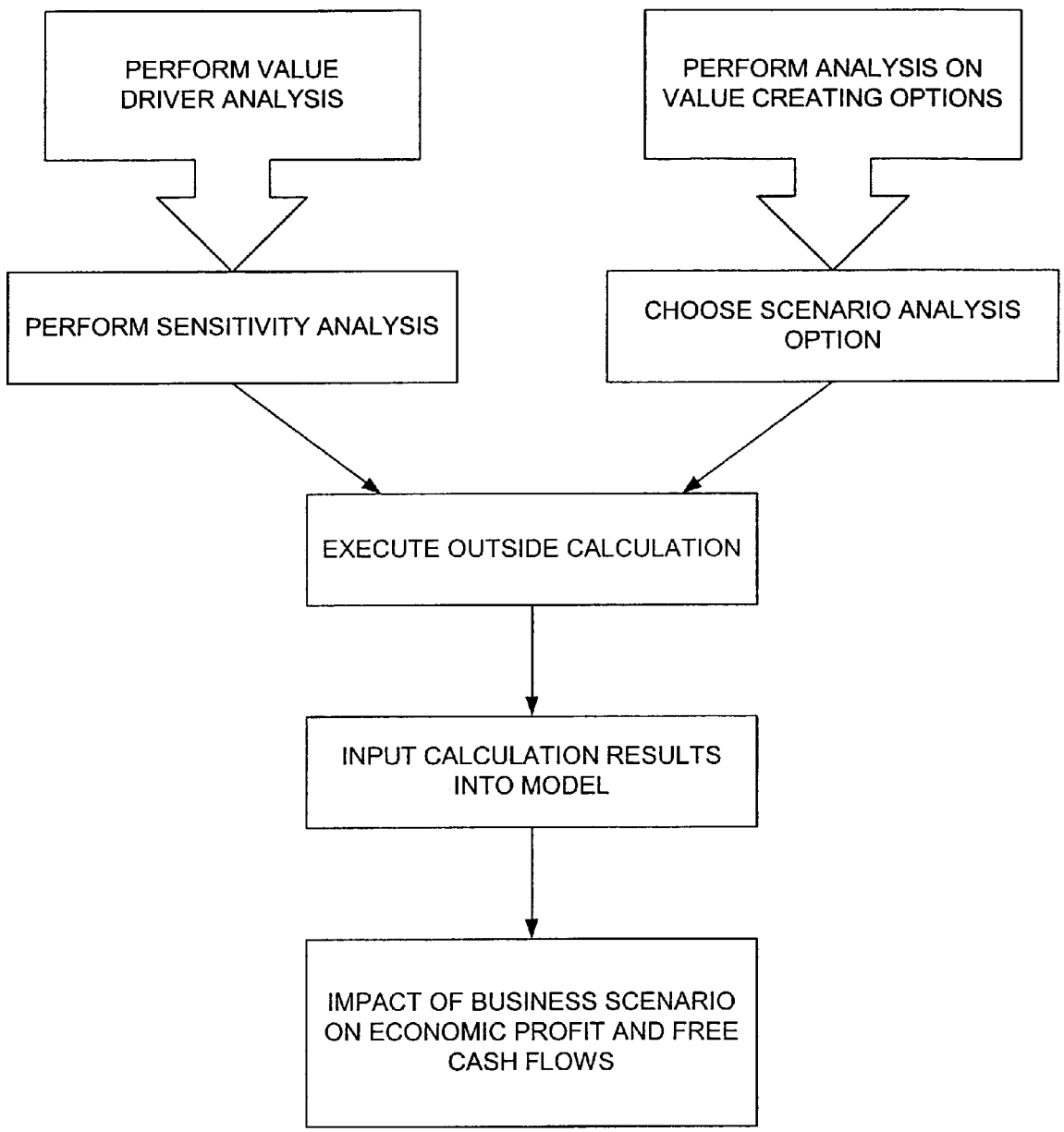
FIG. 22 is a diagram illustrating the role that the Value Impact Model plays in the value driver analysis process according to an embodiment of the present invention.

FIG. 22 is a diagram the VSIMT plays in the value driver analysis process. When a user picks a strategy from the list of available strategies, the tool asks the user a series of questions pertinent to that strategy, in order to help the user to properly collect and input the information necessary for an informed evaluation of the strategy. The tool prompts the user thereby walking him or her through the major considerations and factors for the strategy. For example, if the strategy is acquisition, the tool will prompt the user for assumptions regarding the costs over time of consolidating operations, the economies expected over time to be obtained by the consolidations, the time frame over which the strategy will be implemented and effected, and various categories of potential liabilities such as environmental cleanup liability which may be inadvertently acquired, and other relevant considerations. This process of presenting a list of strategies, and then asking the user a series of questions relevant to the strategy or strategies chosen, helps to ensure that all pertinent assumptions and data are taken into consideration.

With respect to the box labeled "execute outside calculation," the model is not tailored for each business unit. Thus, the user must calculate the more detailed, specific sensitivity analysis of the model. The level of analysis will be determined by the availability of data below the business unit level in the form of income statement and balance sheet. To calculate FCF and EP by process requires an income statement and balance sheet by process. The selectable business scenarios are designed to cover most business decisions that a user will want to test. However, there may be value creation options that do not directly relate to existing scenarios. In such cases, the user may need to use a combination of scenarios to describe the option. Additionally, the general scenario could be used in such cases.

Using the tools, a user can select various targets for adding long term value. The selection can be done by examining one option at a time. The selection can also be performed using a multivariable approach, i.e., be varying more than one input at a time and viewing the combined results and making selections of grouped sets of input variables to change that will, in total, represent the greatest combination of increased shareholder value and manageability from among the various options or groups of options analyzed. For example, implementing a first change may make implementing a second change more manageable. Hence, making the two changes together may produce more return with a greater manageability, than an analysis would show merely by considering each change in isolation from the other. Thus, the tools allow users to pick grouped sets of targets to pursue.

In a further aspect of an embodiment of the invention, the inventors have recognized that setting absolute budgetary numbers can be unrealistic and/or unhelpful, particularly in a fast changing environment. Thus, it may be desirable to set relative rather than absolute goals for the organization. For example, rather than setting an absolute goal of increasing sales by 5%, the budget could include the relative goal of outperforming the relevant market segment by 2%. Such relative targets could include both financial goals and non financial targets. A relative non-financial target could include, for example, the target of being viewed as the most environmentally responsible company within its industry. Relative goals could encompass not only sales, but many other aspects of the budgeting process, including the cost of raw materials, the cost of labor including overtime, the cost of capital and debt, and many other factors. The result can be much more realistic and meaningful budgets and targets.

All of the tools which are discussed herein as being web based could, of course, be implemented in other networks, including but not limited to company intranets and other secure networks. Although it is intended that the network based systems will operate in typical client/server fashion, that is not strictly necessary, and a variety of network architectures and protocols are possible.

The processes and tools described above help to improve accuracy of forecasts, improve strategy formulation, and improve efficiencies of budgeting and planning. One advantage of making plans, budgets, and forecasts more accurate is that doing so improves the credibility of management. Because management credibility is an important aspect in the equity market's valuation of a company, the processes and tools described herein can add value by making management more credible in terms of the specific goals to be achieved and how those goals will be achieved, and by reducing the gaps between expected company performance and actual performance. Once the accuracy of a company's forecasts have been improved, increased market valuation can be accomplished therefore by communicating the improved forecasts and the improved accuracies of those forecasts.

Figure 23:
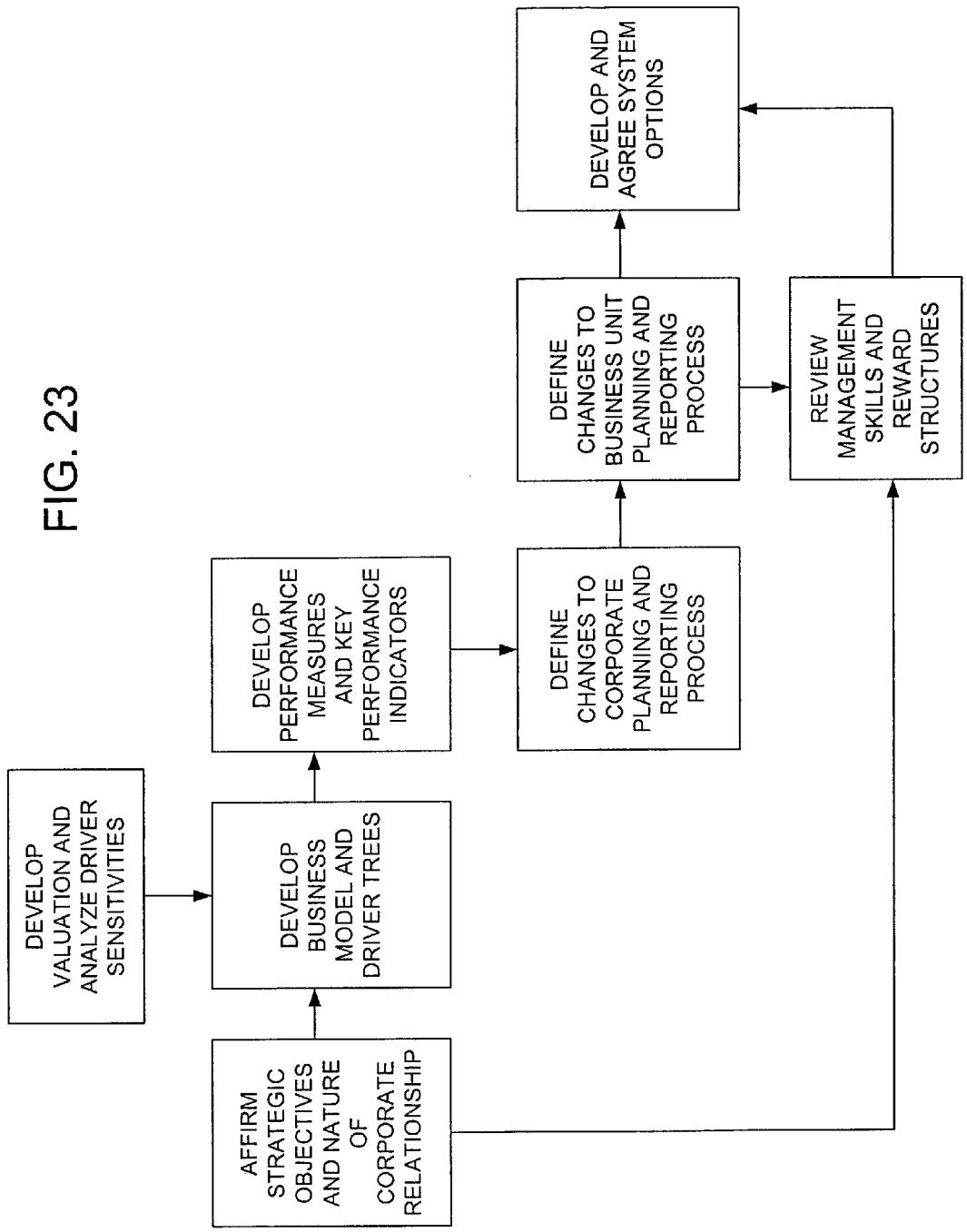
FIG. 23 is a diagram illustrating a holistic approach to business planning and reporting, and alignment according to an aspect of one embodiment of the invention.

FIG. 23 illustrates a further aspect of an embodiment. In this aspect, a holistic approach is used to develop a strategic planning solution for a business organization by taking into account a broad array of components within the enterprise planning process. That approach includes the steps of affirming strategic objectives and nature of corporate relationships; developing valuation and analyzing driver sensitivities; based upon said strategic objectives and sensitivities, developing a business model and driver trees; based upon said business model and driver trees, developing performance measures and key performance indicators; based upon said performance measures and key performance indicators, defining desired changes to implement in corporate planning and reporting processes; based upon said desired changes, defining changes to business unit planning and reporting processes; based upon said desired changes to said planning and reporting processes; based upon said strategic objectives, reviewing management skills and reward structures and modifying said reward structures; based upon said management skills and reward structures, and further based upon said desired changes to said planning and reporting processes, developing and agreeing system options. The strategic objectives may be selected and affirmed using any or all of the tools previously described.

Additional background and details regarding aspects of the present invention can be found in U.S. provisional patent application no. 60/418,218, filed Oct. 11, 2002, which is hereby incorporated by reference in its entirety. It will be appreciated that the term "present invention" as used herein should not be construed to mean that only a single invention having a single essential element or group of elements is presented. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method of obtaining increased value and utility from a budgeting process employed within a business organization, comprising:
    selecting a first set of value-adding targets for the business organization obtained from external research of comparison companies within a same industry as the business organization, including:
        querying, using a computer, a computer database containing historic data for a plurality of peer companies to compare performance of the peer companies;
        identifying value-adding strategies currently utilized within the plurality of peer companies based on high performance within the historic data; and
        choosing the first set of value-adding targets from the currently utilized value-adding strategies of the peer companies by factoring shareholder value expected to be returned and peer company performance comparisons;
    selecting a second set of value-adding targets for the business organization obtained from an internal evaluation of business opportunities and value drivers existent within the organization, including:
        identifying, at a high level within the organization, key value drivers from the potential value-adding opportunities, the key value drivers including drivers expected to substantially affect long term value of stock of the organization;
        testing sensitivity of the organization's stock price to the value drivers, comprising:
            utilizing a stock price valuation model tool to predict future cash flows based on historic data and user inputted financial data, discount the future cash flows over specific time periods to the present day at an appropriate cost of capital, and generate a range of stock prices,
            wherein the user inputted financial data includes at least one of working capital, value of current inventory including both tangible and intangible assets, depreciation and amortization, accounts receivable, accounts payable, growth in invested capital, capital expenditures, effective tax rate, debt load and debt interest rate, operating expenses, revenue, historic growth, other liabilities, other assets, terminal growth rate for the industry, discount rate, market risk premium, and number of shares outstanding; and utilizing a sensitivity analysis tool to determine how predicted future cash flows and key financial drivers will impact the organization's stock price, wherein the key financial drivers include at least one of sales volume, sales prices, manufacturing costs, distribution costs, administrative costs, tax costs, working capital and capital expenditures; and selecting one or more targets based upon the stock price sensitivity to the value drivers;

evaluating the first set of value-adding targets and the second set of value-adding targets, including:

producing predictions for an amount of shareholder value to be delivered by meeting the targets, assessing difficulty of obtaining the targets using a value management financial analysis tool;

preselecting targets from among the first and second sets of value-adding targets based on a multivariable approach incorporating at least shareholder value and the difficulty;

selecting organizational targets by the high level management from among the preselected value-adding targets;

communicating the selected organizational targets downward to persons through the organizational hierarchy;

adjusting budgetary priorities within a budget of the business organization as a result of the selected organizational targets;

performing bottom-up budgeting and cyclical forecasting to implement the selected organizational targets within the budget of the organization, including the steps of:

populating, according to the selected organizational targets, budget forms including a plurality of expenditure categories and placeholders within the budget through referencing the selected organizational targets and providing budgetary numbers;

flowing the populated budgets upward through the organizational hierarchy;

obtaining review and approval of a consolidated version of the populated budgets by the high level management of the business organization; and adopting budgets and forecasts consistent with the selected organizational targets;

employing the populated budgets throughout the organizational hierarchy, thereby allocating money to specified expenditures and projects;

measuring performance of the organization in accordance with the selected organizational targets; and revising the organizational targets in response to the measured performance and repeating budgetary planning steps within the business organization with implementation of the revised organizational targets.

2. The method of claim 1 further comprising:

evaluating at an upper level of the organizational hierarchy whether the budgets sufficiently support the selected organizational targets after the populated budgets have been flowed upward.

3. The method of claim 2 further comprising:

providing feedback regarding misalignments between the budgetary numbers and the selected organizational targets; and adjusting the budgetary numbers to more closely align the budgetary numbers with the selected organizational targets according to the feedback.

4. The method of claim 1, wherein the budget forms include budgeting categories corresponding to the selected organizational targets.

5. The method of claim 4 wherein the categories corresponding to the selected organizational targets include tasks and sub-tasks for achieving the selected organizational targets.

6. The method of claim 1 wherein the budget forms occurs after the target selecting step.

7. The method of claim 1 further comprising:

after the steps of evaluating and selecting organizational targets, but before the step of distributing the budget forms, incorporating within the budget forms the selected organizational targets in order to ensure alignment of the targets with operational plans of the organization.

8. The method of claim 1, further comprising: as part of measuring performance of the organization, including within a single financial report feedback regarding variances between projected and actual expenditures, and variances between projected and actual accomplishment of the selected organizational targets.

9. The method of claim 8 wherein the variances are provided on a single page of the financial report, thereby providing side-by-side comparisons of financial performance and accomplishment of the organizational targets.

10. A non-transitory computer-readable medium comprising a plurality of code segments for obtaining increased value and utility from a budgeting process employed within a business organization, comprising:

a code segment for selecting a first set of value-adding targets for the business organization obtained from external research of comparison companies within a same industry as the business organization, including:

querying, using a computer, a computer database containing historic data for a plurality of peer companies to compare performance of the peer companies;

identifying value-adding strategies currently utilized within the plurality of peer companies based on high performance within the historic data; and choosing the first set of value-adding targets from the currently utilized value-adding strategies of the peer companies by factoring shareholder value expected to be returned and peer company performance comparisons;

a code segment for selecting a second set of value-adding targets for the business organization obtained from an internal evaluation of business opportunities and value drivers existent within the organization, including:

identifying, at a high level within the organization, key value drivers from the potential value-adding opportunities, the key value drivers including drivers expected to substantially affect long term value of stock of the organization;

testing sensitivity of the organization's stock price to the value drivers, comprising:

utilizing a stock price valuation model tool to predict future cash flows based on historic data and user inputted financial data, discount the future cash flows over specific time periods to the present day at an appropriate cost of capital, and generate a range of stock prices, wherein the user inputted financial data includes at least one of working capital, value of current inventory including both tangible and intangible assets, depreciation and amortization, accounts receivable, accounts payable, growth in invested capital, capital expenditures, effective tax rate, debt load and debt interest rate, operating expenses, revenue, historic growth, other liabilities, other assets, terminal growth rate for the industry, discount rate, market risk premium, and number of shares outstanding; and utilizing a sensitivity analysis tool to determine how predicted future cash flows and key financial drivers will impact the organization's stock price, wherein the key financial drivers include at least one of sales volume, sales prices, manufacturing costs, distribution costs, administrative costs, tax costs, working capital and capital expenditures; and selecting one or more targets based upon the stock price sensitivity to the value drivers;

a code segment for evaluating the first set of value-adding targets and the second set of value-adding targets, including:

producing predictions for an amount of shareholder value to be delivered by meeting the targets, assessing difficulty of obtaining the targets using logic from a value management financial analysis tool;

a code segment for preselecting targets from among the first and second sets of value-adding targets based on a multivariable approach incorporating at least shareholder value and the difficulty;

a code segment for selecting organizational targets by the high level management from among the preselected value-adding targets;

a code segment for communicating the selected organizational targets downward to persons through the organizational hierarchy;

a code segment for adjusting budgetary priorities within a budget of the business organization as a result of the selected organizational targets;

a code segment for performing bottom-up budgeting and cyclical forecasting to implement the selected organizational targets within the budget of the organization, including the steps of:

populating, according to the selected organizational targets, budget forms including a plurality of expenditure categories and placeholders within the budget through referencing the selected organizational targets and providing budgetary numbers;

flowing the populated budgets upward through the organizational hierarchy;

obtaining review and approval of a consolidated version of the populated budgets by the high level management of the business organization;

and adopting budgets and forecasts consistent with the selected organizational targets;

a code segment for employing the populated budgets throughout the organizational hierarchy, thereby allocating money to specified expenditures and projects;

a code segment for measuring performance of the organization in accordance with the selected organizational targets; and a code segment for revising the organizational targets in response to the measured performance and repeating budgetary planning steps within the business organization with implementation of the revised organizational targets.

11. The computer-readable medium of claim 10 further comprising:

a code segment for evaluating at an upper level of the organizational hierarchy whether the budgets sufficiently support the selected organizational targets after the populated budgets have been flowed upward.

12. The computer-readable medium of claim 10 further comprising:

a code segment for flowing, after the evaluating step, the budget downward within the organizational hierarchy and providing feedback regarding misalignments between the budgetary numbers and the selected organizational targets; and a code segment for adjusting the budgetary numbers to more closely align the budgetary numbers with the selected organizational targets according to the feedback.

13. The computer-readable medium of claim 10, wherein the budget forms include budgeting categories corresponding to the selected organizational targets.

14. The computer-readable medium of claim 13 wherein the categories corresponding to the selected organizational targets include tasks and sub-tasks for achieving the selected organizational targets.

15. The computer-readable medium of claim 10 wherein populating the budget forms occurs after the target selecting step.

16. The computer-readable medium of claim 10 further comprising:

a code segment for incorporating, after the steps of evaluating and selecting organizational targets but before the step of distributing the budget forms, within the budget forms the selected organizational targets in order to ensure alignment of the targets with operational plans of the organization.

17. The computer-readable medium of claim 10 further comprising:

as part of measuring performance of the organization, including within a single financial report feedback regarding variances between projected and actual expenditures, and variances between projected and actual accomplishment of the selected organizational targets.

18. The computer-readable medium of claim 17 wherein the variances are provided on a single page of the financial report, thereby providing side-by-side comparisons of financial performance and accomplishment of the organizational targets.

19. A system for obtaining increased value and utility from a budgeting process employed within a business organization, comprising:

a component for selecting a first set of value-adding targets for the business organization obtained from external research of comparison companies within a same industry as the business organization, including:

a component for querying, using a computer, a computer database containing historic data for a plurality of peer companies to compare performance of the peer companies;

a component for identifying value-adding strategies currently utilized within the plurality of peer companies based on high performance within the historic data; and a component for choosing the first set of value-adding targets from the currently utilized value-adding strategies of the peer companies by factoring shareholder value expected to be returned and peer company performance comparisons;

a component for selecting a second set of value-adding targets for the business organization obtained from an internal evaluation of business opportunities and value drivers existent within the organization, including:

a component for identifying, at a high level within the organization, key value drivers from the potential value-adding opportunities, the key value drivers including drivers expected to substantially affect long term value of stock of the organization;

a component for testing sensitivity of the organization's stock price to the value drivers, comprising:

a component for utilizing a stock price valuation model tool to predict future cash flows based on historic data and user inputted financial data, discount the future cash flows over specific time periods to the present day at an appropriate cost of capital, and generate a range of stock prices, wherein the user inputted financial data includes at least one of working capital, value of current inventory including both tangible and intangible assets, depreciation and amortization, accounts receivable, accounts payable, growth in invested capital, capital expenditures, effective tax rate, debt load and debt interest rate, operating expenses, revenue, historic growth, other liabilities, other assets, terminal growth rate for the industry, discount rate, market risk premium, and number of shares outstanding; and a component for utilizing a sensitivity analysis tool to determine how predicted future cash flows and key financial drivers will impact the organization's stock price, wherein the key financial drivers include at least one of sales volume, sales prices, manufacturing costs, distribution costs, administrative costs, tax costs, working capital and capital expenditures; and a component for selecting one or more targets based upon the stock price sensitivity to the value drivers;

a component for evaluating the first set of value-adding targets and the second set of value-adding targets, including:

producing predictions for an amount of shareholder value to be delivered by meeting the targets, assessing difficulty of obtaining the targets using a value management financial analysis tool;

a component for preselecting targets from among the first and second sets of value-adding targets based on a multivariable approach incorporating at least shareholder value and the difficulty;

a component for selecting organizational targets by the high level management from among the preselected value-adding targets;

a component for communicating the selected organizational targets downward to persons through the organizational hierarchy;

a component for adjusting budgetary priorities within a budget of the business organization as a result of the selected organizational targets;

a component for performing bottom-up budgeting and cyclical forecasting to implement the selected organizational targets within the budget of the organization, including the steps of:

a component for populating, according to the selected organizational targets, budget forms including a plurality of expenditure categories and placeholders within the budget through referencing the selected organizational targets and providing budgetary numbers;

a component for flowing the populated budgets upward through the organizational hierarchy;

a component for obtaining review and approval of a consolidated version of the populated budgets by the high level management of the business organization; and a component for adopting budgets and forecasts consistent with the selected organizational targets;

a component for employing the populated budgets throughout the organizational hierarchy, thereby allocating money to specified expenditures and projects;

a component for measuring performance of the organization in accordance with the selected organizational targets; and a component for revising the organizational targets in response to the measured performance and repeating budgetary planning steps within the business organization with implementation of the revised organizational targets.

20. The system of claim 19 wherein populating the budget forms occurs after the target selecting step.

21. The system of claim 19 further comprising:

a component for incorporating, after the steps of evaluating and selecting organizational targets but before the step of distributing the budget forms, within the budget forms the selected organizational targets in order to ensure alignment of the targets with operational plans of the organization.

* * * * *